United States Patent
Gorinevsky

(10) Patent No.: US 8,121,818 B2
(45) Date of Patent: Feb. 21, 2012

(54) METHOD AND SYSTEM FOR DIAGNOSTICS OF APPARATUS

(75) Inventor: Dimitry Gorinevsky, Palo Alto, CA (US)

(73) Assignee: Mitek Analytics LLC, Palo Alto, CA (US)

( * ) Notice: Subject to any disclaimer, the term of this patent is extended or adjusted under 35 U.S.C. 154(b) by 493 days.

(21) Appl. No.: 12/268,357

(22) Filed: Nov. 10, 2008

(65) Prior Publication Data
US 2010/0121609 A1 May 13, 2010

(51) Int. Cl.
*G06F 11/30* (2006.01)
*G06F 19/00* (2006.01)
*G06F 17/40* (2006.01)

(52) U.S. Cl. ........ 702/183; 73/865.8; 73/865.9; 702/34; 702/182; 702/187; 702/189

(58) Field of Classification Search ............... 73/112.01, 73/112.03, 432.1, 865.8, 865.9; 340/500, 340/540, 679, 680; 438/14; 701/1, 29, 99, 701/100; 702/1, 33, 34, 35, 127, 182, 183, 702/184, 185, 187, 189
See application file for complete search history.

(56) References Cited

U.S. PATENT DOCUMENTS

| | | | | |
|---|---|---|---|---|
| 2,883,255 | A * | 4/1959 | Anderson | 346/34 |
| 3,184,725 | A * | 5/1965 | Siegel et al. | 340/674 |
| 3,321,613 | A * | 5/1967 | Searle | 702/182 |
| 5,919,267 | A | 7/1999 | Urnes et al. | |
| 6,336,065 | B1 | 1/2002 | Gibson et al. | |
| 6,456,928 | B1 | 9/2002 | Johnson | |
| 6,539,783 | B1 | 4/2003 | Adibhatla | |
| 6,598,195 | B1 | 7/2003 | Adibhatla et al. | |
| 6,606,580 | B1 | 8/2003 | Zedda et al. | |
| 6,662,089 | B2 | 12/2003 | Felke et al. | |
| 6,850,811 | B1 | 2/2005 | Stewart | |
| 6,909,960 | B2 | 6/2005 | Volponi et al. | |
| 7,020,595 | B1 | 3/2006 | Adibhatla et al. | |
| 7,062,370 | B2 | 6/2006 | Vhora et al. | |
| 7,072,797 | B2 | 7/2006 | Gorinevsky | |
| 7,251,582 | B2 | 7/2007 | Singh et al. | |
| 7,295,950 | B2 * | 11/2007 | Iyengar | 702/182 |
| 7,792,660 | B2 * | 9/2010 | Iyengar | 702/183 |
| 2004/0088100 | A1 | 5/2004 | Volponi | 701/100 |
| 2005/0222747 | A1 * | 10/2005 | Vhora et al. | 701/100 |
| 2007/0005301 | A1 * | 1/2007 | Iyengar | 702/185 |
| 2008/0048860 | A1 * | 2/2008 | Iyengar | 340/540 |

OTHER PUBLICATIONS

S. Boyd et al., Convex Optimization, Cambridge University Press, Cambridge, UK, 2004.
G.C. Goodwin et al., "Lagrangian duality between constrained estimation and control", Automatica, vol. 41, pp. 935-944, 2006.

(Continued)

*Primary Examiner* — Edward Cosimano
(74) *Attorney, Agent, or Firm* — Haynes and Boone, LLP; Pavel I. Pogodin

(57) ABSTRACT

Proposed is a method, implemented in software, for estimating fault state of an apparatus outfitted with sensors. At each execution period the method processes sensor data from the apparatus to obtain a set of parity parameters, which are further used for estimating fault state. The estimation method formulates a convex optimization problem for each fault hypothesis and employs a convex solver to compute fault parameter estimates and fault likelihoods for each fault hypothesis. The highest likelihoods and corresponding parameter estimates are transmitted to a display device or an automated decision and control system. The obtained accurate estimate of fault state can be used to improve safety, performance, or maintenance processes for the apparatus.

24 Claims, 14 Drawing Sheets

OTHER PUBLICATIONS

D. Gorinevsky, "Monotonic regression filters for trending gradual deterioration faults", American Control Conf., pp. 5394-5399, Boston, MA, Jun. 2004.

D. Gorinevsky, "Optimal estimate of monotonic trend with sparse jumps", American Control Conf., New York, NY, Jun. 2007.

D. Gorinevsky, "Efficient filtering using monotonic walk model", American Control Conf., Seattle, WA, Jun. 2008.

D. Gorinevsky et al., "Early detection of solid rocket motor case-breach failure", AIAA GN&C Conference, Hilton Head, SC, AIAA-2007-6774, Aug. 2007.

D. Gorinevsky, "Tools for optimal estimation of hidden trends in FDC", Presentation at SEMATECH AEC/APC Symposium, Palm Springs, CA, Sep. 2007.

R. Isermann, "Model-based fault detection and diagnosis—status and applications", 16th IFAC Symposium on Automatic Control in Aerospace (ACA'2004), St. Petersburg, Russia, 2004. (also published in Annual Reviews in Control, vol. 29, 2005, pp. 71-85).

S. Qin et al., "A survey of industrial model predictive control technology", Control Engineering Practice, vol. 11, No. 7, pp. 733-764, 2003.

A. Zymnis et al., "Relaxed Maximum a Posteriori Fault Identification", Signal Processing, 89(6): 989-999, Jun. 2009 (to appear).

A. Zymnis et al., "Mixed State Estimation for a Linear Gaussian Markov Model", IEEE Conf. on Decision and Control, Cancun, Mexico, Dec. 2008.

D. Gorinevsky, "Mixed Data Fusion for Engine Health Management", Turbine Engine Technology Symposium (TETS'08), Dayton, OH, Sep. 11, 2008.

K. Mathioudakis et al., "Turbofan performance deterioration tracking using nonlinear models and optimization techniques", Trans. of ASME, Journ. of Turbomachinery, vol. 124, No. 5, pp. 580-587, 2002.

C. Rao et al., "Constrained linear state estimation—a moving horizon approach," Automatica, vol. 37, pp. 1619-1628, 2001.

M.L. Tyler et al., "Application of moving horizon estimation based fault detection to cold tandem steel mill", International Journal of Control, vol. 73, No. 5, pp. 427-438, 2000.

E.P. Gatzke et al., "Use of Multiple Models and Qualitative Constraints for On-line Moving-horizon Disturbance Estimation and Fault Diagnosis", Journal of Process Control, vol. 12, No. 2, pp. 339-352, 2002.

* cited by examiner

| Channel | $z_1$ | $z_2$ | $z_3$ | $z_4$ | $u_1$ | $u_2$ | $u_3$ | $u_4$ | $u_5$ | $u_6$ | $u_7$ | $u_8$ |
|---|---|---|---|---|---|---|---|---|---|---|---|---|
| Signature | 1 | 0 | 0 | 0 | 0.0138 | -0.0065 | 0.0210 | -0.0073 | 0.0199 | 0.0006 | 0.0434 | 0.0177 |
| Data | 0 | 0 | 0 | 0 | 0.0045 | -0.0164 | -0.0075 | 0.0157 | 0.0405 | -0.0094 | 0.0673 | 0.0005 |

FIG. 10

METHOD AND SYSTEM FOR DIAGNOSTICS OF APPARATUS

GOVERNMENT RIGHTS

This invention was made with Government support under contract number NCC2-1426 awarded by NASA. The Government has certain rights in this invention.

FIELD OF THE INVENTION

The present invention is related generally to diagnostic and monitoring systems wherein there is a combination of computing device, which implements a computational method for diagnostics and a device or apparatus diagnosed and monitored thereby. "Apparatus" here may include a machine, an industrial plant, a vehicle, manufacturing process, facility, utility system, or other engineered system. "Diagnostics" here is defined as determining whether an apparatus is operating normally and, if not, determining more detained information about the fault or failure experienced by the apparatus from the available data.

BACKGROUND OF THE INVENTION

Modern apparatuses such as aerospace or ground vehicles, propulsion systems, electrical power systems, industrial equipment and machines, etc are outfitted with sensors and digital processors for control and monitoring of the apparatuses. Diagnostics functions are control and monitoring functions that have to do with an abnormal, faulty, operation of the apparatus. The diagnostics functions could be used for improving safety of the system operation, e.g., by halting the operation or by switching to a degraded mode of operation; for improving system performance, e.g., by adapting the system control or scheduling; and for facilitating maintenance and repair, e.g., by providing a guidance on which of a plurality of possible maintenance actions should be undertaken.

The discussion below is related to computational method for diagnostic estimation. "Diagnostic estimation" here is defined as a diagnostic function determining which of plurality of fault conditions exist in the apparatus, e.g., which part of the apparatus is faulty, and further determining fault states. The "fault states" here are defined as quantitative characteristics of the fault conditions, e.g., an extent or degree of damage of the part. Parametric fault states are the fault states described by real numbers and discrete fault states are the fault states described by binaries, e.g., 0/1 or true/false, or by integer numbers. Diagnostic estimation computes statistical estimates of the fault states of the apparatus from the available apparatus data.

Most of embedded digital electronics used in modern systems includes low-level diagnostics functions. Such prior art diagnostic functions are usually univariate, i.e., each function is performed by observing a single signal. The univariate approach is usually adequate for detecting and diagnosing faults localized at a single embedded sensor or single control loop in the system. However, there is also an important need for detecting and diagnosing faults, which are not localized and that simultaneously impact readings of many sensors and/or outputs of many low-level diagnostic functions. Some of the prior art diagnostic systems integrate and process simultaneous fault diagnostics codes by using AI (artificial intelligence) reasoning methods. The AI methods are based on suboptimal heuristics because they are dealing with hard problems that have combinatorial complexity.

Some of the background technology includes multivariable model-based diagnostic estimation, which integrates and fuses the data from multiple sensors and multiple low-level diagnostics codes. Multivariable model-based methods are known in advanced control systems area. Though the multivariable advanced control methods pursue a different problem (control rather than the diagnostic estimation) they are related to the proposed method in the computational approach part. Much of prior multivariable control work is based on linear models and linear analysis methods. The linear models and methods cannot adequately address the multivariable diagnostic estimation problems because they cannot deal with nonlinearities, constraints, and system structure changes. A more relevant prior art is Model Predictive Control (MPC), which is a control method overwhelmingly used in process industries. MPC computes control at each time step by solving a batch optimization problem over a moving prediction horizon. The important advantages of MPC are that (i) it can handle constraints on the control or system variables and (ii) it can handle system structure changes such as missing sensor data and off-control actuators.

Conventional technology related to the subject of this invention includes Moving Horizon Estimation (MHE) algorithms. MHE is based on ideas related to the MPC but is aimed at estimation rather than at control problems. MHE computes estimates of hidden state parameters by solving a batch optimization problem over a moving horizon of past observation data; MHE optimizes model fit to the observation data. The MHE or a related optimization based approach can be used for multivariable diagnostics estimation, but there are two difficulties that need to be overcome. One difficulty is that the fault estimation problems are nonlinear. Another difficulty is that these problems include discrete variables that describe the presence or absence of faults. Incorrect estimation of these discrete variables could lead to false positives and false negatives in the fault detection; both types of errors are undesirable. Presence of the discrete variables could lead to combinatorial complexity of the problem.

MHE or other optimization-based methods can be implemented for diagnostic estimation by computing an optimal estimate of the fault parameters using standard algorithms for solving mixed problems with parametric and discrete estimated variables. Such algorithms used in the prior art include GA (Genetic Algorithms), MIQP (Mixed-integer Quadratic Programming), and MILP (Mixed-integer Linear Programming). Besides being inherently suboptimal in dealing with the combinatorial complexity, these methods are slow and, thus, not suitable for real time use in an embedded system or for centralized data processing for a large fleet of monitored devices (e.g., monitoring a fleet of engines). For example, U.S. Pat. No. 6,606,580 indicates that using GA optimization method for diagnostic estimation of faults in turbine engine required about an hour of computations.

SUMMARY OF THE INVENTION

The inventive methodology is directed to methods and systems that substantially obviate one or more of the above and other problems associated with conventional techniques for diagnostic and monitoring.

An embodiment of the invention addresses the problem of integrated multivariable diagnostics by proposing a new method that includes optimization-based approach for diagnostic estimation. Multivariable diagnostic estimation problems are hard computationally and analytically because of nonlinearity and discrete nature of faults; this invention teaches a method for diagnostics estimation that overcomes the difficulties. The proposed method is rigorous; it has superior sensitivity, accuracy, conceptual simplicity, and computational performance compared to the prior art multivariable diagnostic methods.

It is an aspect of the present invention to provide a method for diagnostic estimation of fault states of an apparatus. The proposed fault diagnostics method is preferably implemented in software and can be adapted to work with different types of applications (faults, apparatuses, and systems) by changing initial data processing step of the method, fault signatures used in the method, and other configurable parts of the method. The method performs apparatus monitoring and for that purpose it is intended to execute repeatedly and periodically after obtaining additional data from the sensors attached to the apparatus or its environment. The advantages of the proposed method that will become clear from the detailed description set forth below include accuracy, computational efficiency, conceptual clarity, implementation convenience, and maintainability after initial implementation has been completed.

The proposed method computes diagnostic estimates of faults of an apparatus, which can be in either a no-fault condition or one or more fault conditions. The apparatus comprises apparatus condition sensors connected to a computer processor, which implements the method. At each time (execution) period t, the method comprises the following four steps. Step 1: processing data from the sensors to obtain a set of parameters y, known as parity parameters, which reflect apparatus condition deviation from normality. Step 2: collecting the parity parameters y over a moving horizon interval of time of a fixed maximal duration and ending at time period t in a data vector Y(t); Step 3: computing estimates of the fault conditions and likelihood parameters for each of the fault conditions; Step 4: transmitting the computed estimates of the fault conditions to a display device or to an automated decision and control system or storing the computed estimates in memory.

In Step 1 parameters y might be obtained from the sensor data as prediction residuals: differences of the observed sensor readings and the readings predicted for apparatus model which receives the same inputs as the apparatus. Different types of the apparatus model can be used such as a dynamic model, a nonlinear map, a set of static values corresponding to a chosen steady state regime, or another computer simulation model of the apparatus.

The fault condition k at time period t, which is estimated at Step 3, is characterized by fault intensity parameter $x_k(t)$ and the fault signature corresponding to the fault condition k is known at the time of the method application. The fault signatures can be obtained as responses observed in the data y when a fault occurs or as approximations of such responses.

The computation of diagnostic estimates for faults, which is performed at Step 3, comprises computing estimates of the fault intensity parameters $x_k(t)$ over the moving horizon interval of time and likelihood parameters $p_k$ for each fault condition k. Step 3 computations are done for one fault condition k at a time in two sub-steps: first by employing a 'formulator' and then by employing an 'optimizer'. The formulator is a software module, which formulates a convex optimization program for fault condition using the moving horizon data vector Y(t). The optimizer is a software module, which numerically finds the solution of the convex optimization program encoded by the formulator; the solution is computed with a pre-defined accuracy for fault condition k. The convex program for the fault condition can include additional decision variables in addition to the fault intensity parameters $x_k(t)$.

The convex optimization program encoded by the formulator, and solved by the optimizer can have one of the known forms, for which efficient optimization solvers are known, such as an isotonic or monotonic regression program, a univariate convex program, a Quadratic Program, a Linear Program, a Second-order Cone Program. These and many other types of constrained convex optimization programs can be efficiently solved using an interior-point method or other suitable convex optimization method. An important advantage of the proposed approach is that it could be set up to allow formulating and solving the convex optimization problem if one or more of the components of vector Y(t) is missing or unavailable.

The diagnostic estimates for faults obtained at Step 3 and used at Step 4 comprise estimates of fault condition intensity parameters $x_k(t)$ over the moving horizon interval of time computed as the optimal solution and likelihood parameters $p_k$ computed as the optimum value of the program. The fault condition parameters $x_k(t)$ and likelihood parameters $p_k$ computed by the optimizer can be used for determining one or several most likely candidate fault conditions (by sorting the likelihoods) and intensities of these conditions. This information can be employed for improving safety of the apparatus operation by halting or reconfiguring the operation in an event of the fault. The reconfiguration can be also used for improving apparatus performance. Alternatively, knowing which fault might have most likely occurred can be used for scheduling a correct maintenance action with reduced troubleshooting effort.

The proposed method can be implemented on-line in a computer or computers connected to the sensors of the apparatus or it can be implemented off-line by collecting data from the apparatus, transmitting it by electronic means to a computer implementing the method, and performing the method computations at a later time. The present invention also encompasses a system for diagnostics of an apparatus; the system implements the proposed method. The invention also encompasses a software program product comprising computer readable media implementing the proposed method.

The proposed method, or a system implementing the method, or a software program product implementing the method are generic and with proper adjustment, tuning, configuration, and integration can be used in many different applications for many types of apparatuses. Three possible embodiments of the method described in detail below include monitoring solid rocket motor of launch vehicle for improving safety of manned space flight, monitoring jet engines to improve aircraft servicing and maintenance, and monitoring semiconductor manufacturing tool to improve its performance. The proposed invention can be used in many additional applications. These applications include but are not limited to heating, ventilation, and air conditioning equipment, chillers, and refrigerators; oil drilling rigs; various aircraft systems, including the propulsion system; ground vehicles (cars, tracks, and military vehicles) and their systems; industrial manufacturing processes, such as refineries and pulp and paper plants; and other.

Important advantages of the proposed method include but are not limited to the following:

i. A convex program formulated by the formulator and solved by the optimizer is guaranteed to have a single global solution that can be efficiently computed.

ii. A convex program can be solved very fast, especially for specialized forms of such problem that are described in detailed description below. In particular, such solution can be implemented in a real-time system.

iii. Encoding the problem as a convex program allows explicit implementation of constraints on the decision variables.

iv. The method can accommodate nonlinearities by employing models obtained by linearization at different conditions as separate fault models; an example is discussed in the detailed description.

v. The method includes computation of the fault state likelihood as a byproduct of the optimization; this enables computing fault ambiguity group by sorting the likelihoods and thresholding them.

vi. The method can accommodate missing data; this can be done by formulator dropping the terms with the missing data in the optimization problem Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 10 is a chart which shows example results of diagnostic estimation for a turbine engine.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

This invention claims a method for diagnostic estimation of fault states of an apparatus; the method can be implemented as a part of monitoring system or as a software program product. The proposed fault diagnostics method is preferably implemented in software and can be adapted to work with different types of applications (faults, apparatuses, and systems) by changing initial data processing step of the method, fault signatures used in the method, and other configurable parts of the method. The embodiments described below describe examples of the apparatuses for which this method can be implemented; the method is not limited to these example apparatuses.

Figure 1:
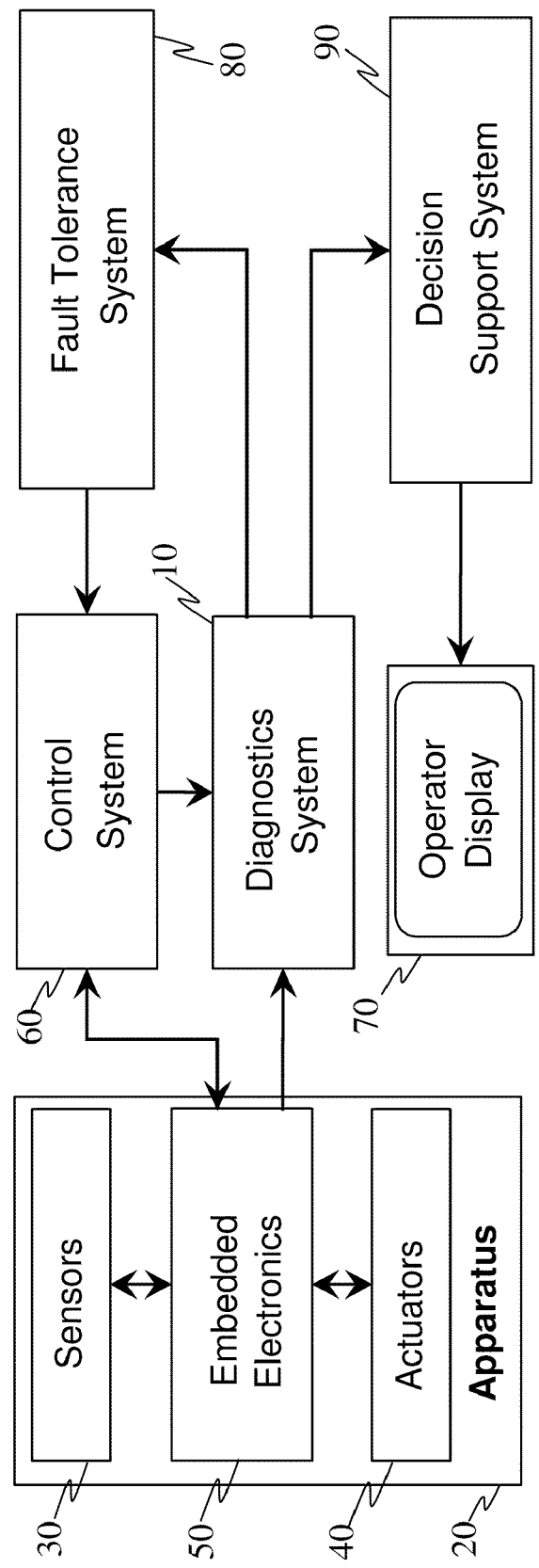
FIG. 1 is a block diagram which illustrates functionality of a representative monitoring and control system implementing the method proposed by this invention.
Figure 2:
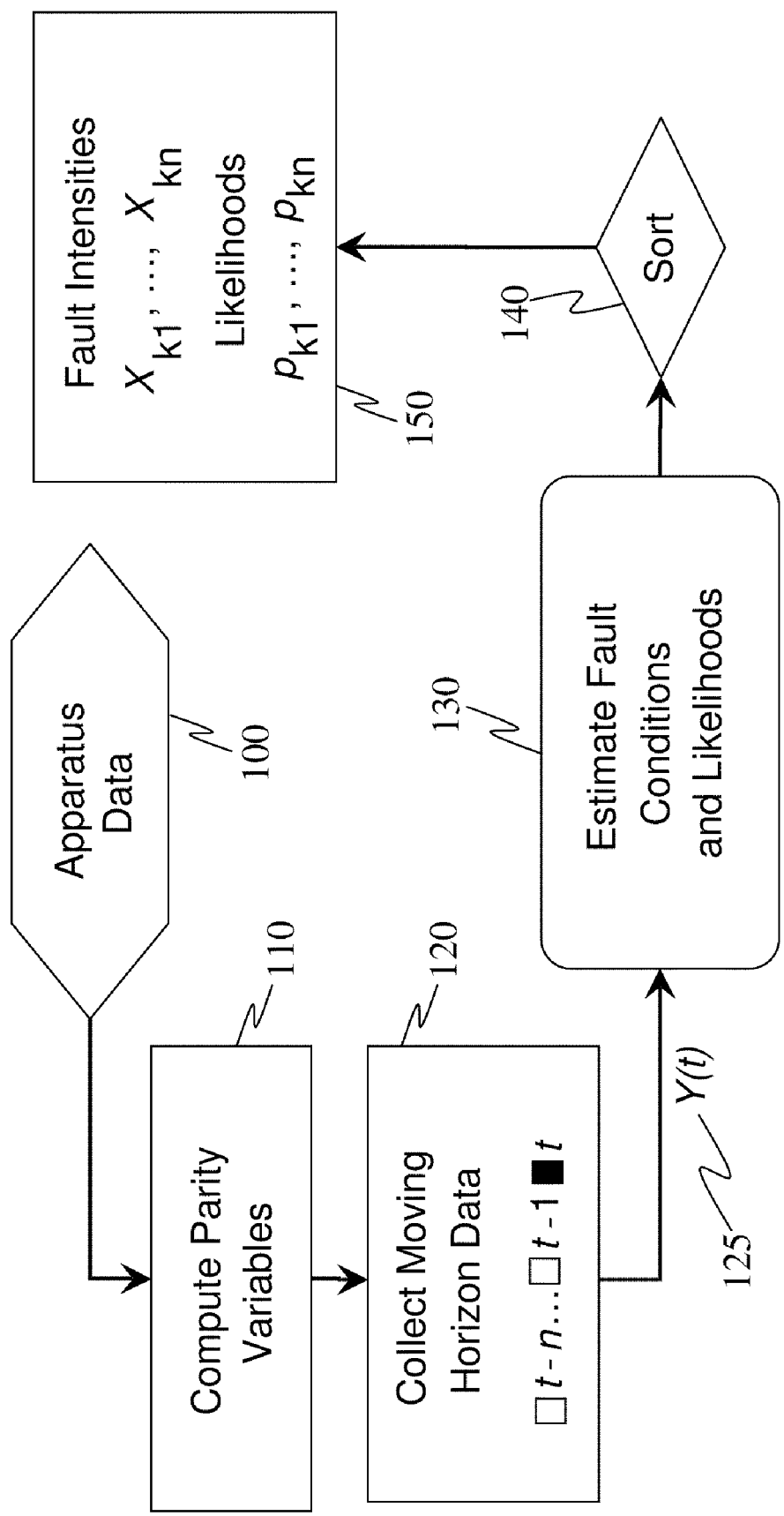
FIG. 2 is a block diagram which depicts overall functionality and component parts (steps) of the method proposed by this invention.
Figure 3:
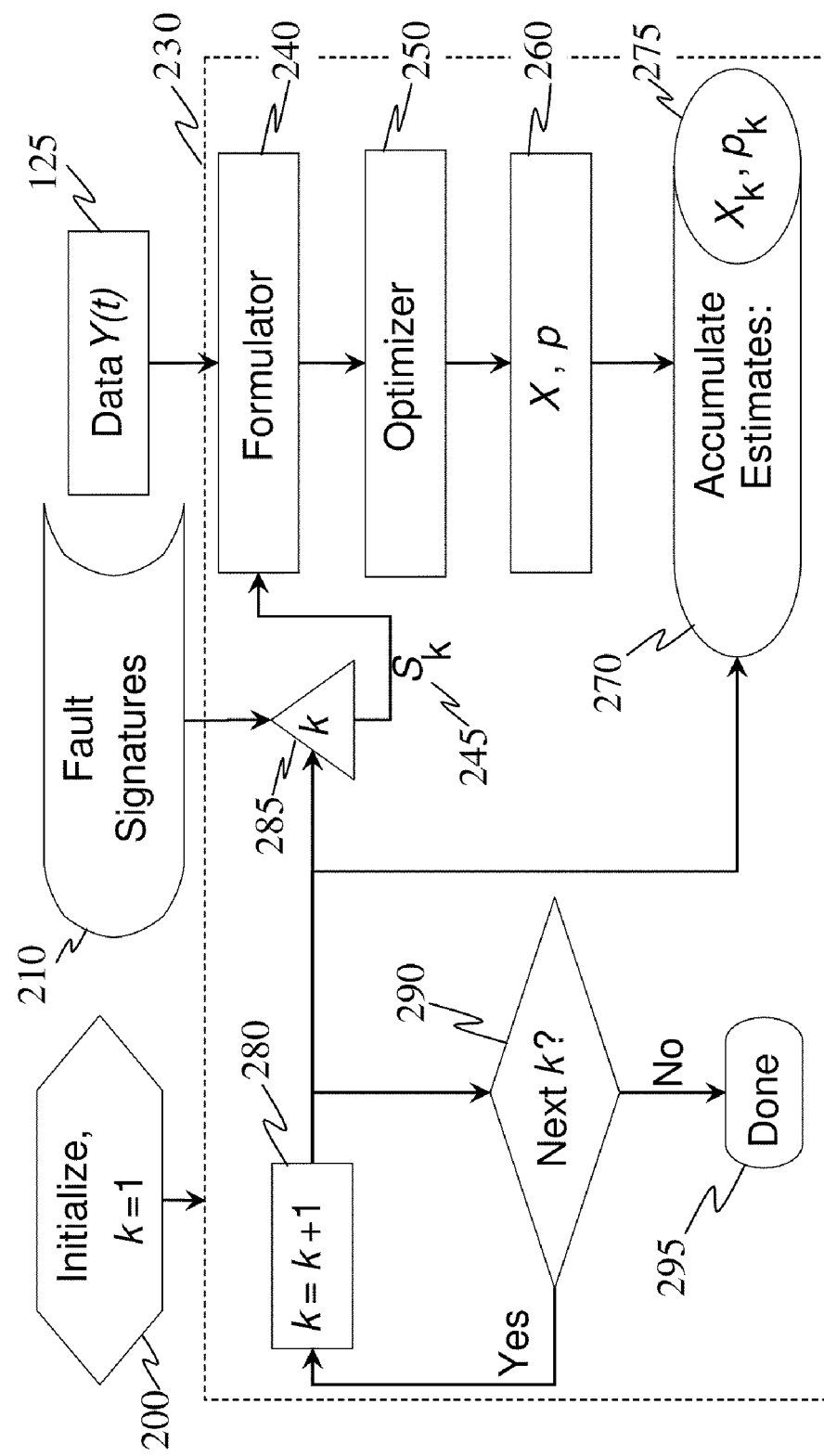
FIG. 3 is a block diagram which depicts overall functionality and component parts (steps) of the optimization based estimation algorithm in the center of the method proposed by this invention.

One preferred embodiment of the invention set forth below is aimed at enhancing safety of human space flight by monitoring solid rocket motor (SRM) propulsion of a crew launch vehicle. The second preferred embodiment is aimed at improving the accuracy of maintenance actions in servicing aircraft jet engines. The third preferred embodiment is aimed at improving performance of a semiconductor manufacturing tool, such as an etch tool. FIG. 1, FIG. 2, and FIG. 3 each relate to all preferred embodiments described below.

FIG. 1 illustrates a preferred embodiment with diagnostics system 10 receiving data from apparatus 20 and providing the fault state estimates to fault tolerance system 20 and decision support system 90. Apparatus 20 can be any engineering system: propulsion system, engine, ground, air, space, or water vehicle, machine, device, electrical power system, semiconductor manufacturing tool, HVAC equipment, computer network, etc. In one preferred embodiment, apparatus 20 is propulsion system of a rocket launch vehicle (rocket motor) or of an aircraft (jet engine). In another preferred embodiment, apparatus 20 is a semiconductor manufacturing tool, such as an etch tool. The proposed invention is applicable to different types of system including but not limited to the systems described in detail below. Diagnostic system 10 implements the proposed method and can be any suitable programmable computing device such as a general-purpose desktop computer, mainframe computer, server, avionics module, engine control unit, embedded processor, or FPGA device.

Apparatus 20 includes one or more sensors 30; it could also include one or more actuators 40. Embedded electronics 50 interfaces with sensors 30 and actuators 40. Embedded electronics 50 also interfaces with control system 60, which would be normally implemented in an embedded computer, and with diagnostic system 10. Some of the sensors 30 could be used for diagnostics only and not used by control system 60.

In some embodiments, the diagnosed fault state of the system or determined 'no fault' state is transmitted to fault tolerance system 80, which might perform system reconfiguration, such as switching to backup hardware, or implementing a mission management action, such as mission re-planning. FIG. 1 shows fault tolerance system 80 interfaced with control system 60. Control system commands that influence apparatus 20 are also transmitted to diagnostic system 10.

In some embodiments, the diagnosed fault state of the system is transmitted to decision support system 90, which processes the diagnostic estimates and prepares operator advisory information to be shown in operator display 70. The displayed advisory can be used for on-line decision, e.g., by an aircraft pilot or a tool operator, or off-line, e.g., by maintenance personnel for deciding which of the plurality of possible maintenance and troubleshooting actions should be undertaken.

FIG. 2 illustrates the preferred embodiment of the diagnostics system 10 in more detail. The system is engaged periodically at a time period that is known. FIG. 2 illustrates performance of diagnostic system 10 at time period with a sequential number t. Apparatus data 100, which serve as the input, include the data obtained by diagnostics system 10 from embedded electronics 50 of the apparatus and from control system 60. Apparatus data 100 are used to compute parity variables 110.

Computation of parity variables is a part of the proposed method that might differ substantially between different types of apparatuses and between different apparatuses of the same type, e.g., between different jet engines. The computation is based on a model of apparatus; different types of models might be used including static or dynamic physics-based models, neural network maps, or process recipes. Parity variables are herein defined as such transformations of the apparatus data, which are supposed to be zero according to the model of the apparatus nominal operation. In the first preferred embodiment (the SRM case breach detection), the parity variables are the differences between the predicted and actually measured accelerations of the rocket. In the second preferred embodiment (the turbine engine diagnostics), the parity variables comprise the differences between the actual engine output data and the data predicted based on the engine model, which has the same inputs as the actual engine; the parity variables further comprise discrete fault flags computed by lower-level fault detection logic. In the third preferred embodiment (the semiconductor manufacturing tool), the parity variables are the deviations of the measured variables from the set values in the recipe.

The parity variables are collected in a moving horizon data set Y(t) 125, which includes the parity variables obtained over the horizon of length of last n time periods of the diagnostic estimation. In one embodiment, the data computed at the previous cycles are stored in the memory 120 and included into the moving horizon data set 125. An important and useful feature of the proposed invention is that is can be used even if a part of the data in the set 125 is missing; the data can be missing because the sensors readings are lost or unavailable to diagnostics system or because some sensors fail. As a special case, the horizon length can be n=1, in which case only the most recent data are used for diagnostics. The moving horizon length n can be determined as a part of system engineering tradeoffs; the proposed invention does can be implemented with different lengths n of the moving horizon.

Data set Y(t) 125 serves as the main input into estimation of fault condition and likelihoods 130; the said estimation is detailed in FIG. 3 and the description of FIG. 3 below. As mentioned above, the invention assumes that there are K different fault states. The proposed method determines which fault state actually exists and what fault intensity is. Estimation 130 produces an output data set 150 that includes fault intensity parameter vectors $X_k$ and likelihood values $p_k$ for each of the K possible fault states. Sorter 140 ranks the estimates in the order of decreasing likelihood and selects a short list of the faults that are most likely to have occurred. The short list is also known as an ambiguity group. If the apparatus is determined to be in the 'no-fault' state, the ambiguity group contains no (zero) faults states. In the preferred embodiment the short list includes data for the faults with the likelihoods above a given threshold.

FIG. 3 illustrates the preferred embodiment of the method for batch estimation 130 from the moving horizon data Y(t) 125 at a given time period t of operation of diagnostics system 10. Faults signatures 210 are shown as an additional input to the estimation. In the first preferred embodiment (the SRM case breach detection), fault signatures 210 can be computed based on fault number using a simple formula. In the second preferred embodiment (the turbine engine diagnostics), fault signatures 210 are computed using a model of the engine. In the third preferred embodiment (the semiconductor manufacturing tool), fault signatures 210 are computed off-line from the historical fault data and are stored in a table.

The estimation computations 230 start by performing initialization 200. The initialization resets the fault state number k to k=1. In one embodiment, the initialization includes computing likelihood of the 'no-fault' hypothesis. The computations are performed in cycle 230 for one fault condition at a time. For a given fault condition k, fault signature $S_k$ 245 is obtained by selector 285 from fault signatures 210. Data Y(t) 125 and fault signature $S_k$ 245 are provided as inputs to formulator 240.

An output of formulator 240 is a convex program for the optimal estimation of the fault intensity parameter vector $X_k$ and vector of additional decision variables U. In one embodiment, U includes the hidden states of the system that need to be determined along with X.

Formulator 240 sets up the structure and parameters of the program such as matrices, vectors, and parameters of the optimized loss function and constraints. In the preferred embodiment, the loss function for fault k denoted as $L_k$ is the negative log-likelihood index for a posteriori probability of fault k. In accordance with the Bayes formula, the loss index is $$-\log P(X_k, U|Y) = -\log P(Y|X_k, U) - \log P(X_k, U) + c \qquad (1)$$

where Y=Y(t), the conditional probability $P(Y|X_k,U)$ is known as observation model, and the conditional probability $P(X_k,U)$ is known as prior model. The constant c can be used for normalizing the log posterior index (1) to be the actual likelihood of the fault (in that case c=log P(Y)) or likelihood ratio relative to the 'no-fault' hypothesis (in that case c=log P(Y|0)+log P(0) with 0 denoting the 'no-fault' hypothesis). The loss index $L_k(X_k, U) = -\log P(X_k,U|Y)$ is minimal when the posterior probability $P(X_k,U|Y)$ is maximal; here U is a vector of additional parameters present in the problem. The problem of fault estimation can be stated as $$\text{minimize } L_k(X_k, U) \quad (2)$$

$$\text{subject to } \{X_k, U\} \in \mathscr{C} \quad (3).$$

The specific form of loss index $L_k(X_k, U)$ depends on the fault stochastic model and has significant degree of flexibility. The proposed invention requires the loss index $L_k(X_k, U)$, which is a convex function. The loss index is defined in a convex domain $\mathscr{C}$, which reflects the known constraints on the decision variables $X_k$ and U.

The invention is not limited to one particular type of the loss index (2) and one particular set of constraints (3). It includes the preferred embodiments of (2)-(3) that are discussed below; it also includes different combinations and extensions of these embodiments that yield convex problems of the form (2)-(3) as anyone versed in the art would recognize. A specific choice of the optimization problem formulation and of the parameters of such formulation is a matter of detailed system engineering, such detail are outside of what is claimed by this invention. A detailed formulation can be taken from the published literature or established for the system in hand in a custom way.

Data set Y(t) 125 obtained by moving horizon data collection can be mathematically presented in the form $$Y(t) = col[y(t-n) \ldots y(t)], \quad (4)$$

where y(t) is the parity vector, n is the horizon length parameter, and t is the time step (sample) number. In one embodiment, the fault intensity parameter vector $X_k$ can be represented in the form $$X_k = col[x(t-n) \ldots x(t)], \quad (5)$$

where x(t) is a scalar parameter defining fault intensity. The probabilistic observation model $P(Y|X_k)$ in (2) is expressed as $$y(t) = S_k x(t) + w(t), \quad (6)$$

where $S_k$ is the fault signature vector and w(t) is independent identically distributed observation noise sequence. The probabilistic prior model $P(X_k)$ in (2) is expressed as $$x(t+1) = x(t) + v(t), \quad (7)$$

where v(t) is independent identically distributed process noise sequence. In the first preferred embodiment, assuming that w(t) follows a Gaussian distribution and v(t) follows a one-sided exponential distribution. Such formulation models monotonic irreversible accumulation of the damage x(t) and yields convex problem (2)-(3) of the following specific form $$\text{minimize } \tfrac{1}{2} Q \Sigma_t [y(t) - S_k x(t)]^2 + R \Sigma_t [x(t) - x(t-1)], \quad (8)$$

$$\text{subject to } x(t-1) - x(t) \leq 0, \quad (9)$$

where Q is the covariance of the Gaussian noise w(t) and R is the first momentum of the exponential noise v(t) independent identically. The problem (2)-(3) is an isotonic regression problem for which very fast specialized solution methods are available.

Another embodiment of the probabilistic formulation uses a second-order dynamic model instead of the first-order model (6)-(7)

$$y(t) = S_k x_2(t) + w(t), \quad (10)$$

$$x_1(t+1) = x_1(t) + v_1(t), \quad (11)$$

$$x_2(t+1) = x_1(t) + x_2(t) + v_2(t), \quad (12)$$

where $x_1(t)$ can have a meaning of primary damage and $x_2(t)$ has a meaning of secondary damage, which is observable through y(t); the rate of the secondary damage accumulation is proportional to the primary damage intensity at that time. In this embodiment, the values $x_2(t)$ in the model (10)-(12) contribute to the vector $X_k$ (5) and the values $x_1(t)$ are included into the vector U of additional decision parameters in the problem (2)-(3).

Other embodiments can use different formulations of the convex estimation problem obtained by assuming that v(t) and w(t) are either gaussian, or uniform bounded, or Laplacian, or one-sided exponential noises in the first-order model (6)-(7), the second-order model (8)-(10), or in other linear state-space models with additive noises that might be used to formulate the probabilistic models in (1).

The second preferred embodiment considers a probabilistic formulation where some of the observed parity variables y(t) are discrete variables taking values 0 or 1 only. Such discrete variables correspond to fault warning flags known as BIT (Built-in-test) flags generated by low-level electronics hardware or software in a majority of embedded control and monitoring systems. One embodiment uses probabilistic formulation with discrete variables that has the form.

$$y(t) = \theta_1 [S_k x(t) + w(t)], \quad (13)$$

where $\theta_1$ is the component-wise Heaviside function with a unit threshold and other variables have the same meaning as discussed above. A modification of the model (13) is the discrete model $$y(t) = \theta_1 [|Sx(t) + w(t)|], \quad (14)$$

where S is a matrix, x(t) and w(t) are vectors and the absolute values are computed component wise. Formulation (14) models sensor failure that is manifested as a sensor offset and also might cause a BIT fault flag to be set. Formulations (13) and (14) yield convex terms $-\log P(Y|X_k)$ in the negative log-likelihood index (1). In particular for formulation (13)

$$-\log P(y=1|x) = -\log(2 - \Phi[(1-S_k x)/q] - \Phi[(1+S_k x)/q]), \quad (15)$$

$$-\log P(y=0|x) = -\log(1 + \Phi[(1-S_k x)/q] + \Phi[(1+S_k x)/q]), \quad (16)$$

where $\Phi$ is a cumulative probability density function for the normal distribution with unit covariance, q is the standard deviation of the zero-mean Gaussian noise w(t) and functions of the vectors are computed component-wise.

The embodiments discussed in some detail above and other possible embodiments of this invention formulate the fault state estimation problem as convex optimization problem (2)-(3). The convexity of problem (2)-(3) provides a guarantee that a global optimal solution $X_k$ of the problem (2)-(3) can be efficiently computed using an optimizer 250. One embodiment employs optimizer using an interior-point method. Another embodiment implements the method by using commercially available convex optimizers/solvers such as Mosek or SeDuMi. There are existing optimizers that solve the convex problems of the well-known classes such as QP, Linear Program (LP), Second-Order Conic Program (SOCP), and other such. For on-line implementations, approaches to designing an interior-point convex optimizer are known to one versed in the art and published in numerous books on the subject. An important advantage of the proposed invention is that it can use optimizer 250 designed and implemented as a separate function. Some convex problem embodiments discussed below allow for special case solutions that are simple and faster than solutions obtained using a generic convex optimizer; one such solution for isotonic regression is mentioned below.

In the preferred embodiment illustrated in FIG. 3, optimizer 250 is shown to provide the fault state estimate X and the likelihood p as the outputs 260. The vector X is obtained as an optimal decision vector in the optimization problem (2)-(3) or is made of some components of the optimal decision vector. The likelihood value p is obtained as an optimal value of the log-likelihood index in the optimization problem (2)-(3) or as a simple transformation of such optimal value. In one embodiment, the log-likelihood ratio is converted to probabilistic likelihood by taking an exponent to convert from log-probabilities to probabilities and then multiplying by a scaling factor to normalize the probabilities of the complementary events such that they add up to one. The obtained estimates X and p 260 are added to the set of the accumulated estimates 275 and the computations 230 are repeated for the next fault 280 until all the faults are exhausted 290. After the completion of the computations 295, accumulated estimates 275 are included with the outputs of the diagnostic system 10.

SRM Case Breach Detection for CLV

Figure 4:
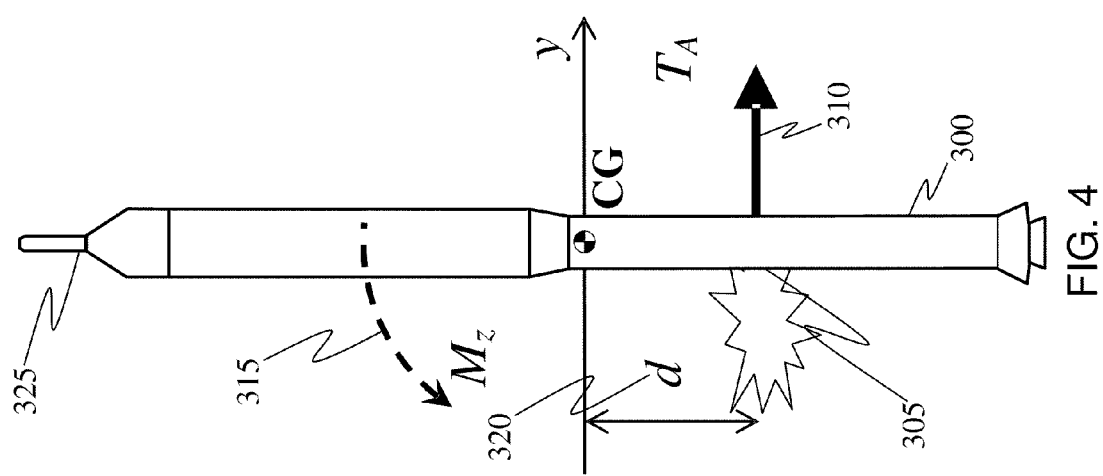
FIG. 4 is a schematic picture illustrating the augmentation force and moment for the crew launch vehicle thrust augmentation fault.

The first preferred embodiment of the invention is discussed below in regard to early detection of Solid Rocket Motor (SRM) case breach detection for crew launch abort in a crew launch vehicle. Ares I crew launch vehicle (CLV), which is being developed by NASA, with a case breach fault in the vehicle SRM is illustrated in FIG. 4. The SRM serves as the first stage of the vehicle. Ares I CLV is the first ever human-rated vehicle with the first stage using exclusively a solid propellant rocket. A timely detection of incipient loss of the launch vehicle control could allow the crew to escape by ejecting the crew capsule. One of the most important failure modes leading to loss of vehicle control is caused by hot gases escaping from the SRM combustion chamber through a case breach; the breach could occur through a joint between SRM segments, through a nozzle joint, or through a igniter seal. The hot gases escaping through the breach create lateral thrust augmentation, with the resulting tilting moment possibly leading to loss of control. By using Thrust Vector Control (TVC) gimballing of the main nozzle, the flight control system would counters attitude disturbances; this could mask the moment augmentation caused by the case breach fault till it overwhelms the TVC and the control is lost.

FIG. 4 illustrates the case breach fault 305 in the first stage SRM 300 of a CLV; $T_A$ 310 is the thrust augmentation force, d 320 is the distance between the case breach location and the rocket center-of-gravity (CG), $M_Z$ 315 is the tilting moment created by the force $T_A$ 310 that is aligned with the lateral axis y. The attached axis is longitudinal and axis z complements y and x. In the first preferred embodiment, the method of the proposed invention is aimed at accurate and fast detection of the case breach fault using Guidance Navigation and Control (GN&C) sensors available on board of the rocket. In one embodiment the diagnostic system is implemented in the vehicle on-board avionics and performs automated decision on initialing crew abort; if sufficient time is available the diagnostic estimated could be presented to the pilot display for the pilot to make the decision to abort the mission and eject crew capsule 325. In another embodiment, the diagnostic system transmits the data to the ground mission management operators who would make the decision. Both embodiment implement the proposed invention; the applicability is defined by acceptable decision delay. The problem of case breach fault estimation is highly nonlinear; the location of the breach and the breach intensity are unknown. The proposed invention allows addressing this problem.

Figure 5:
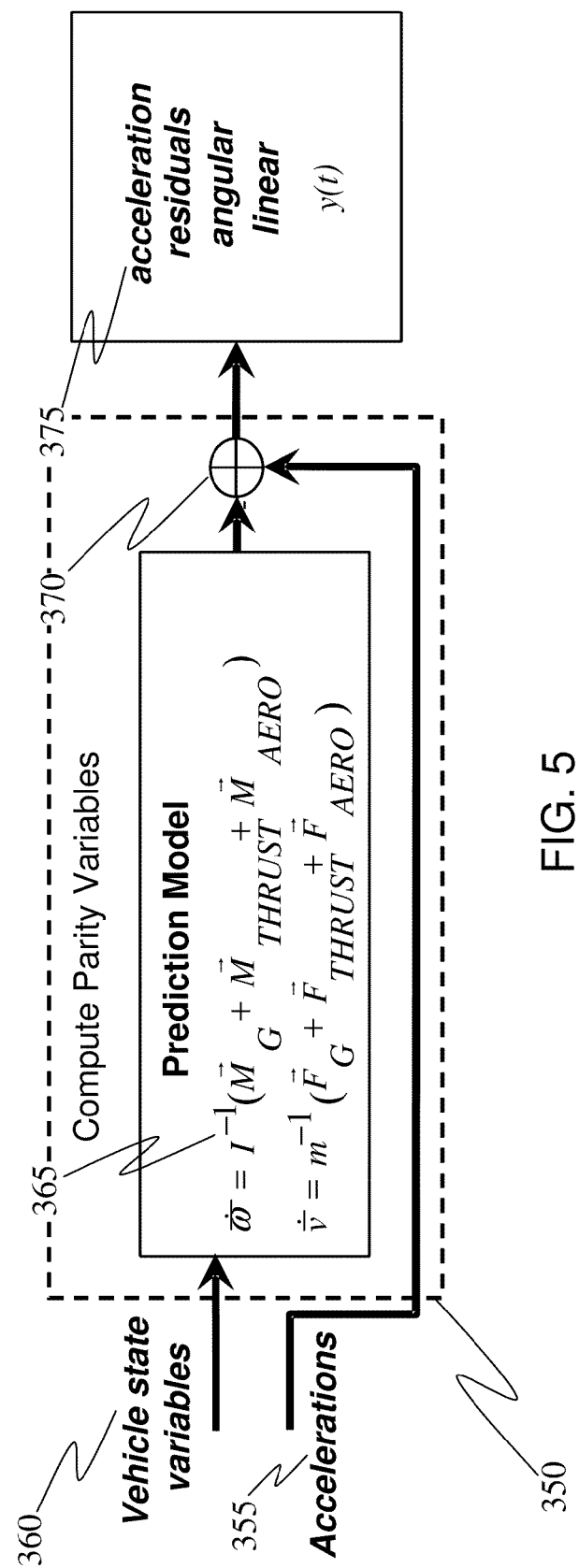
FIG. 5 is a block diagram which illustrates computation of angular and linear acceleration residuals as parity variables for the crew launch vehicle.

FIG. 5 illustrates computation of parity variables 350 in this embodiment, which is the first step in applying the proposed method. The vehicle data used for the parity variable computations are comprised of 6 accelerations (3 rotational and 3 linear), 3 linear velocities, 3 angular rates, 3 attitude angles, altitude (for characterizing air flow), 2 TVC gimbal angles, and flight time (for scheduling). Instantaneous values of linear and angular accelerations are measured by accelerometers in an IMU (inertial measurement unit) of the vehicle. The flow of the computations is illustrated in FIG. 5. One shown input to the computations is the vector of six accelerations 355. Another shown input 360 collects the remaining sensor channels describing the dynamical states of the vehicle rigid-body model. The flight dynamics model is used to compute the total moments and forces acting on the vehicle in the attached coordinate axes 365. Knowing the vehicle inertia tensor and the vehicle mass, the three angular and three linear accelerations of the vehicle in the attached axes are calculated from Euler's equations and Newton's law. The computed accelerations are subtracted 370 from the measured accelerations 355 to yield the 6-component acceleration residual vector y(t) 375. In this embodiment the parity variables are the acceleration residuals. Based on the model they should be zero if there is no fault. In fact, they are impacted by sensor noise, thrust variation, airflow turbulence, and modeling errors. To obtain the moving horizon data set 125, the acceleration residuals y(t) 375 are collected over the horizon of length n as described by (4).

Figure 6:
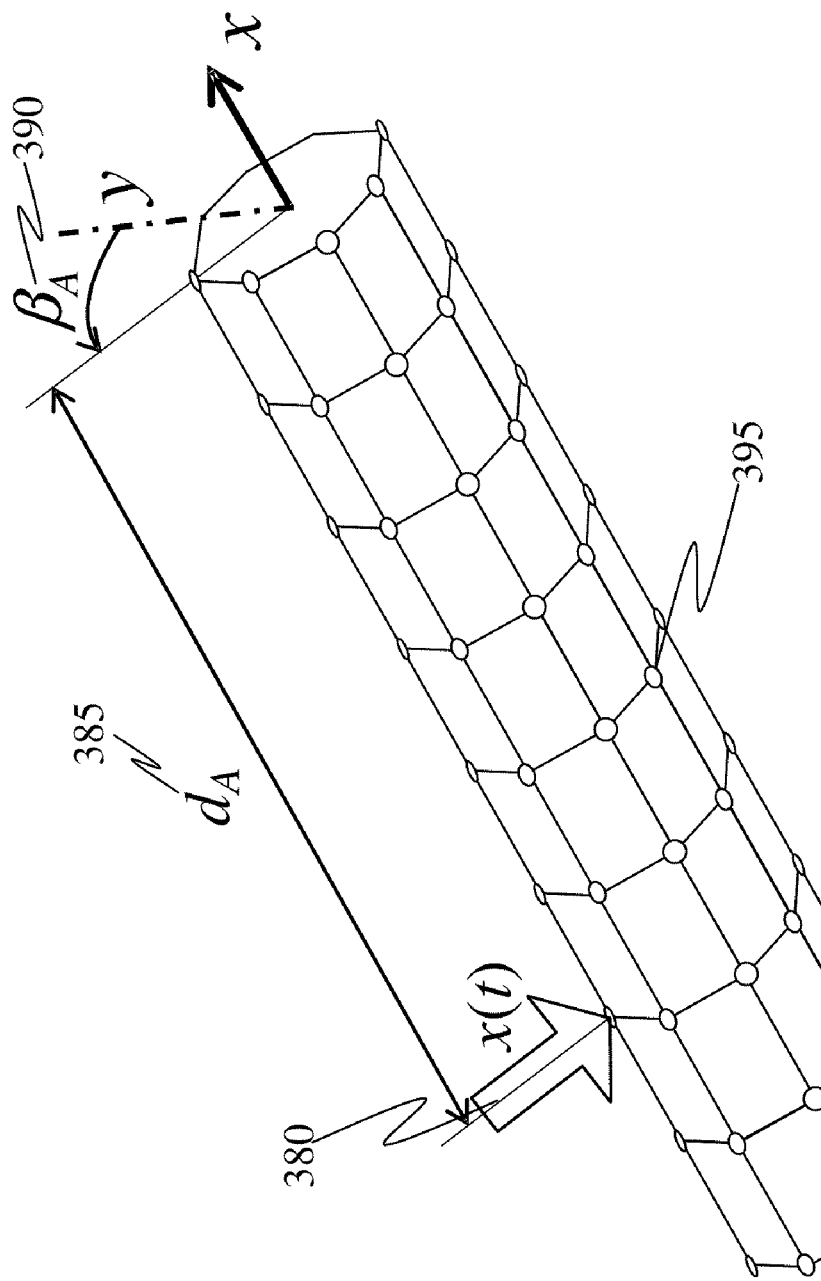
FIG. 6 is a schematic picture which illustrates the discretized fault modeling for the crew launch vehicle thrust augmentation.

FIG. 6 illustrates the fault model in this embodiment. The thrust augmentation is specified by three parameters: magnitude x(t) 380, circumferential angle of the case breach location, $\beta_A$ 390, and longitudinal coordinate of the breach location $d_A$ 385. Though, in fact, the case breach can be located in a continuum of possible locations, the preferred embodiment of this invention assumes that it is located in one of K discrete locations 395 illustrated in FIG. 6. Fault signature models for each of the discrete locations are computed based on the geometry as follows. In this embodiment each fault k corresponds to hypothesis $H_k$ that the breach location is at the known point described by circumferential angle, $\beta_A$ 385 and longitudinal coordinate $d_A$ 390

$$H_k: \{\beta_A = \beta_{A,k}; d_A = d_{A,k}\}(k=1,\ldots,K) \tag{17}$$

For given fault hypothesis $H_k$ and assumed breach location, the thrust augmentation magnitude $T_A = x(t)$ 380 is an time-dependent unknown variable. A MAP estimate of x(t) from the data is obtained used within $H_k$. The null ('no-fault') hypothesis $H_0$ assumes that there is no fault and x(t)≡0. Diagnostic system 10 must determine which of the fault hypothesis holds: whether the fault has occurred and, if yes, what is the fault location index k. For the fault hypothesis $H_k$ the fault data vector $X_k$ has form (6).

For each candidate fault k, formulator 240 formulates a convex problem of optimizing the negative log-likelihood index in the form (2)-(3). Probabilistic model (1) for the index comprises the prior monotonic random walk model of the form (7), where v(t) is one-sided exponentially distributed noise. Such model reflects the prior knowledge that the breach grows irreversibly. Probabilistic model (1) further comprises observation model of the form (6) where the fault signature can be calculated as the effect of the thrust augmentation force 385 in FIG. 6 on the acceleration residuals 375.

$$S_k = \begin{bmatrix} -d_{A,k}\sin\beta_{A,k}/I_{zz} \\ d_{A,k}\cos\beta_{A,k}/I_{yy} \\ -p_A/m \\ -\cos\beta_{A,k}/m \\ -\sin\beta_{A,k}/m \end{bmatrix}, \quad (18)$$

where m is the rocket mass, $I_{zz}$ and $I_{yy}$ are the main moments of inertia, and $p_A$ is a nondimensional coefficient describing the longitudinal thrust decrease in proportion to the lateral thrust augmentation. (The main thrust decreases because the combustion products escaping through the breach do not participate creating the main longitudinal thrust of the SRM).

The probabilistic model (6)-(7), (18) yields the convex optimization problem formulation (8)-(9), which is an isotonic regression problem. This problem can be efficiently and very quickly solved by a convex optimizer 250 implementing one of the known linear-time isotonic regression solutions, such as the PAVA algorithm.

Figure 7:
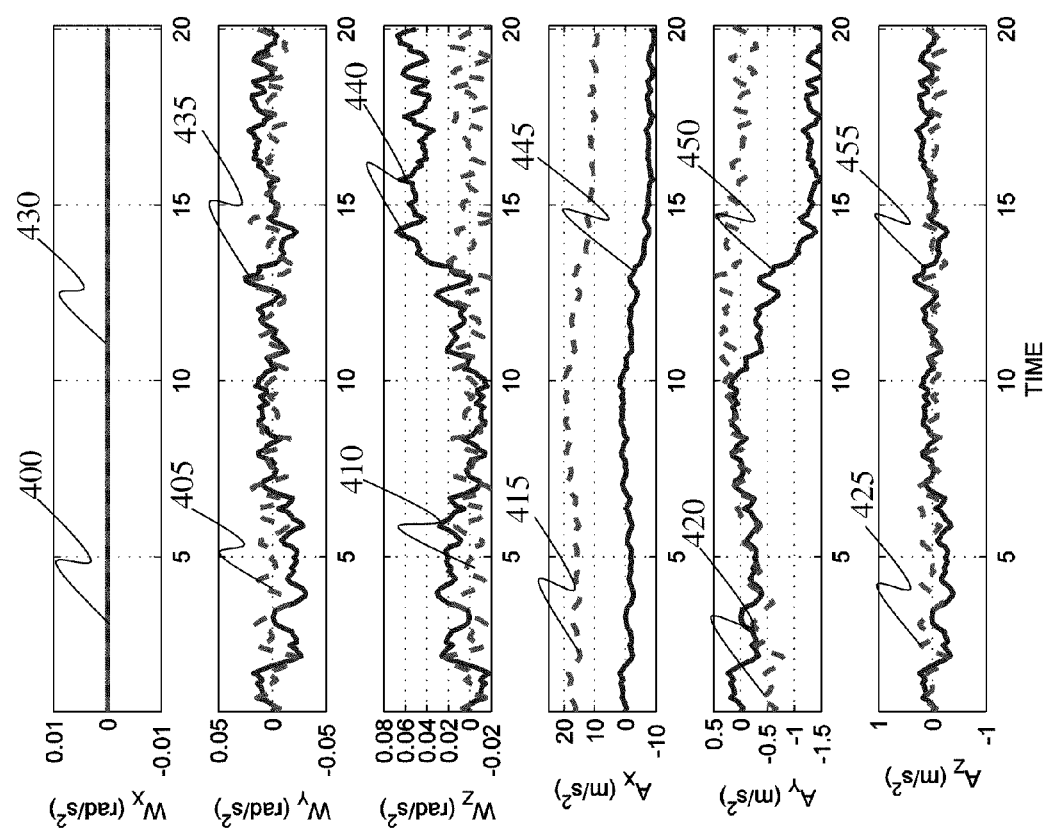
FIG. 7 is a chart which shows simulation results for the flight of crew launch vehicle with a case breach fault including angular and linear accelerations and the angular and linear acceleration residuals.

The described embodiment of the invention was implemented and validated in a detailed simulation of Ares 1 CLV flight. FIG. 6 illustrates simulation results. The simulation included 6-DOF (degree-of-freedom) kinematics and dynamics, TVC actuator model, aerodynamic tables obtained from CFD analysis, SRM thrust augmentation, and a 10% random variation of the SRM thrust, which creates acceleration jitter. In simulation, a case breach fault was introduced as a ramp starting at simulation time 10 sec and reaching a steady state value at time 16 sec. FIG. 7 shows the six accelerations 355 as dashed lines 400, 405, 410 (angular accelerations), and 415, 420, 425 (linear accelerations). Acceleration residuals 375 are shown as solid lines 430, 435, 440 (the angular) and 445, 450, 455 (the linear).

In the simulation, the estimation algorithm worked with the acceleration residual data sampled at 200 ms period over the moving horizon of n=50 samples. The proposed method correctly estimated the magnitude and location of the seeded fault with a 1.5 sec delay after the start of the ramp. The proposed method provided for a superior quality of estimation. The correct location and intensity of the case breach were determined reliably and fast despite the substantial noise contamination of the data.

Figure 8:
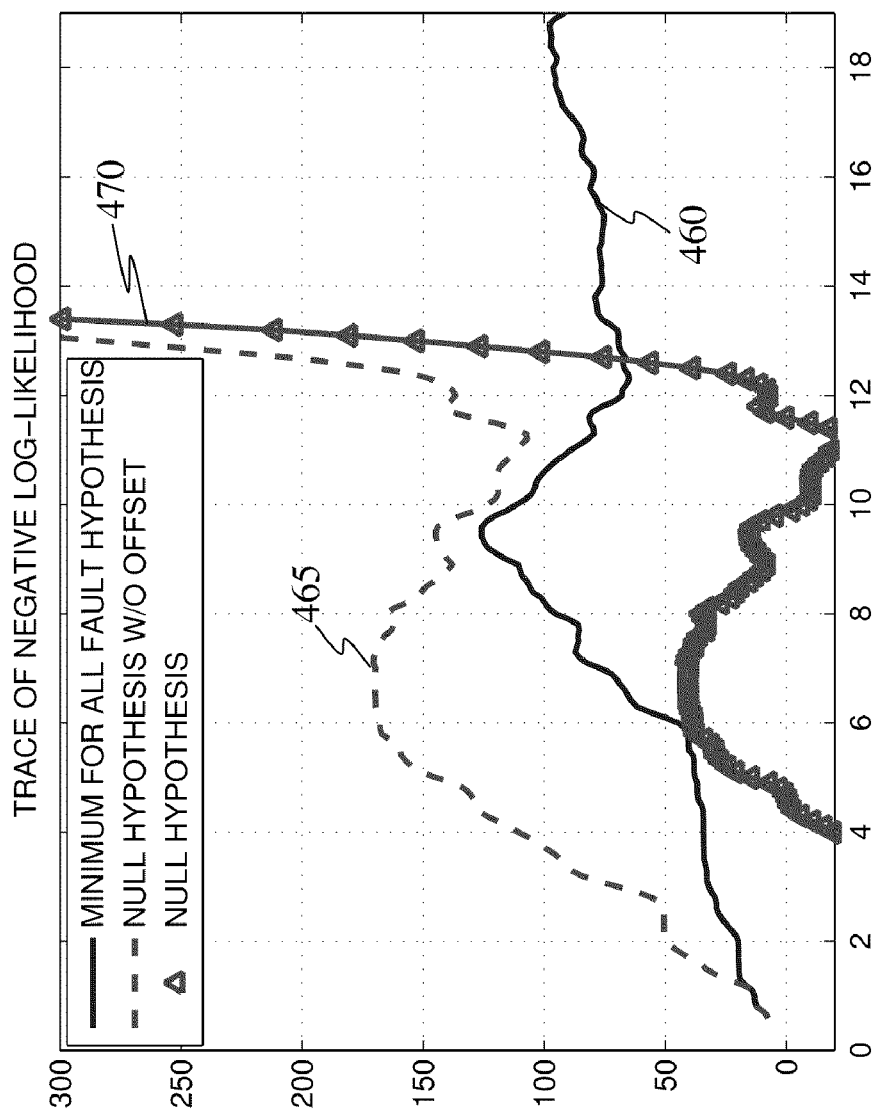
FIG. 8 is a chart which shows negative log-likelihood plots for different fault hypothesis corresponding to the simulation results in FIG. 7.

FIG. 8 illustrates the estimation results obtained with the proposed method by showing the traces of the loss indexes computed at each time step. The solid line 460 shows the point-wise minimum for all fault hypotheses, $\min_k L_k$. The upper dashed curve 465 shows the loss index $L_o$ for the 'no-fault' hypothesis. The curve with the triangular markers 470 shows the 'no-fault' hypothesis index $L_o$ which is offset by $\Delta L = \log(1-P_1)/P_1$; where $P_1$ is the probability of the case breach fault and $(1-P_1)$ is the complementary probability of the 'no-fault' state. The fault is detected when the solid line 460 crosses the triangle marked line 470. The algorithm had very good computational performance with the computation time of a few milliseconds on a PC computer.

Turbine Engine Diagnostics

Figure 9:
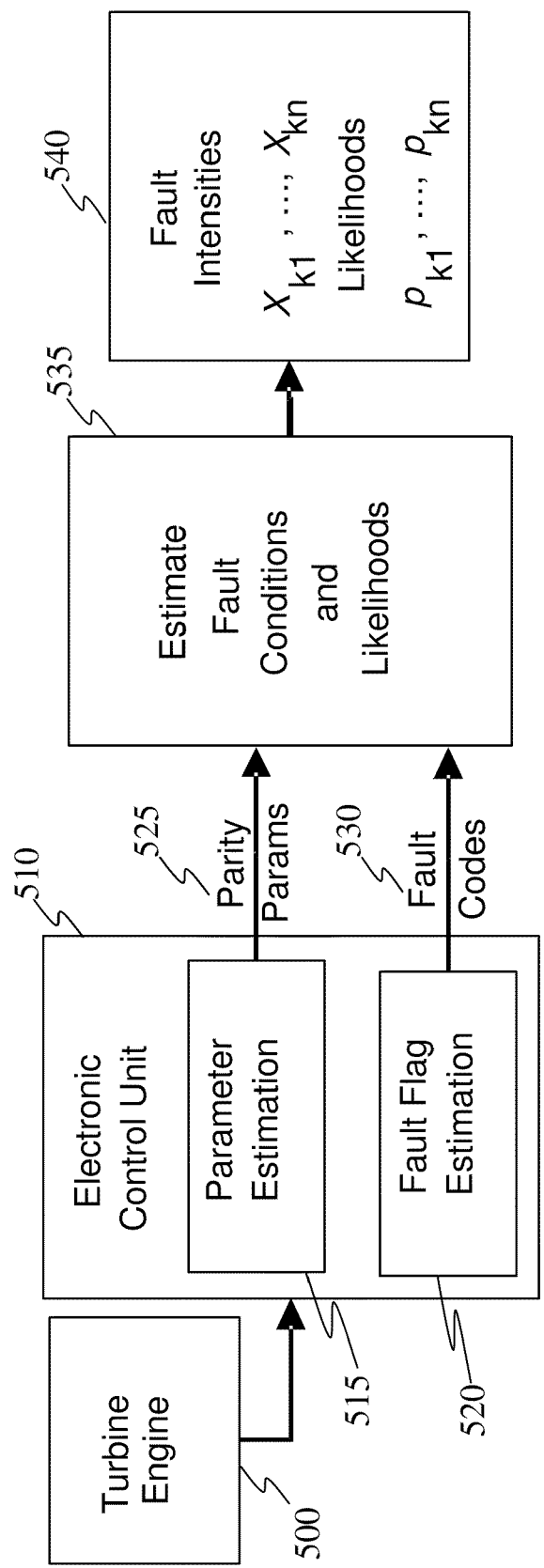
FIG. 9 is a block diagram which illustrates diagnostic estimation for a turbine engine.

The second preferred embodiment of the proposed invention is discussed with respect to a diagnostic system for turbine propulsion engine for aircraft. FIG. 9 illustrates the process of diagnostic estimation for a turbine engine with the proposed method. Turbine engine 500 is equipped with electronic control unit 510, which is interfaced with the engine sensors. FIG. 9 shows that the functionality of electronic control unit 510 includes estimation of engine efficiency parameters 515; this estimation yields deviations of the engine efficiency parameters, such as compressor efficiency, turbine efficiency, etc, from the nominal values. The outputs u(t) of parameter estimation 515 are considered as parity parameters 525. Electronic control unit 510 further includes BIT functions and BIT processing logic shown as a block 520 that estimates discrete fault flags and generates fault codes z(t) 530. The codes z(t) are zero (or absent) in the absence of faults and can be considered as discrete parity parameters.

In the second preferred embodiment the moving horizon has length one, only the data from the last time period are considered. Data vector 125 combines the continuous and discrete parity parameters.

$$Y(t) = y(t) = \begin{bmatrix} u(t) \\ z(t) \end{bmatrix}. \quad (18)$$

The diagnostic system produces the estimates 540 of the fault condition intensities $X_{k1}, \ldots X_{kn}$ and likelihood parameters $p_{k1}, \ldots p_{kn}$ for each of the candidate fault conditions. The estimates 540 are obtained by module 535 as the maximum posteriori probability estimates (1). The optimization program 250 (2)-(3) is formulated 230 by using observation models of the form (6) for the continuous components of the parity vector y(t) (18) and observation models of the form (13) for the discrete components of vector y(t) (18). Fault signatures 210 are available from a detailed simulation model of the engine. In this embodiment Gaussian priors are used for the fault intensity: $x \sim x_k N(m_k, R_k)$, where index k numbers components of vector Y(t) (18) and fault types.

For each potential fault k, an optimization problem (2) is formulated by formulator 230; there are no constraints (3). The log-likelihood optimization problem solved by optimizer 250 has a single decision parameter: fault intensity $x_k$. The problem is convex and the optimal solution is obtained by optimizer using a dichotomy algorithm to find the zero of the gradient of the loss index.

In this embodiment, the computed estimates 150 of the turbine engine fault conditions are transmitted to a display device 70 through a decision support system 90, or to an automated decision and control system 80, or stored in memory for subsequent transmission and analysis. The diagnostic estimates can be performed by software implemented in on-board avionics attached to the engine. The estimates can be used during the flight as a pilot warning and/or stored till the end of the flight. The diagnostic estimates can be also performed in on-ground computers that receive sensor data snapshots obtained during the flight. The ground processing would indicate a possibility of a particular fault and provide maintenance guidance.

FIG. 10 illustrates results for the method implemented for a detailed simulation of a military engine. In this example fault #1 was seeded with magnitude $x_1$=0.1. The following diagnostic report was obtained for data in FIG. 10.

| Fault | Likelihood | Intensity |
|---|---|---|
| FAULT #1 | p = 0.587 | x = 0.109 |
| FAULT #2 | p = 0.413 | x = 0.052 |
| NO FAULT | p = 0.000 | x = 0 |

This report shows that the fault #1 was correctly identified. It also shows that fault #2 has a close but smaller likelihood. Depending on the chosen threshold this second fault can be included into the ambiguity group. The ambiguity is caused by large noise. The noise distortion of the data is illustrated by the difference between the last two rows in the table of FIG. 10.

Predictive Maintenance of Semiconductor Manufacturing Tool

The third preferred embodiment is discussed below with respect to a semiconductor manufacturing tool. Though the specific discussion is for an etch tool, one versed in the art would recognize its full applicability to other tools, including but not limited to a CVD (chemical vapor deposition) tool, CMP (chemical-mechanical polishing), ion beam implantation, lithography tools, and other tools used in semiconductor manufacturing.

Semiconductor manufacturing tools are used in the processes of manufacturing IC (integrated circuits). Such tools are complex machines equipped with multiple sensors 30, actuators 40, and embedded electronics 50. Control system 60 of such tool is operating at two time scales. At the fast time scale is the tool is controlled and monitored while processing a single batch of silicon wafers. At a slower time scale, the tool is controlled and monitored from run to run; this is known as R2R control. In the third preferred embodiment, diagnostics system 10 processes the data obtained over multiple runs. In this embodiment, the time period t is the sequential run number. The diagnostic estimates are transmitted into a decision support system 90 that provides maintenance recommendations for the tool through operator display 70.

The semiconductor manufacturing tools usually implement a fixed recipe for long periods of time. In this embodiment, tool R2R data 100 are used to compute parity variables 110 as deviations of the monitored parameters from the recipe.

An example of the third preferred embodiment is discussed below is its implementation for an etch tool. An engineering design of the diagnostic and monitoring system requires a selection of the monitored variables and selection of the fault parameters to be estimated. Such selection is driven by fault frequency and impact as well as by ability to estimate the faults from the monitored variables. The selection is outside of the method proposed by this invention. For the etch tool example we consider the following four monitored variables: 'REFLECTED RF POWER', 'ELECTRODE COOLING TEMPERATURE', 'PRESSURE CONTROL VALVE', and 'ENDPOINT DETECTOR'. The deviations of these variables from the recipe at run t comprise the observation vector y(t). The proposed diagnostic estimation method monitors (and estimated the intensity of) the following three potential faults: 'HIGH REFLECTED RF POWER', 'LOWER ELECTRODE TEMPERATURE', and 'CHAMBER LEAK'. The intensities of these faults correspond to deviations of the respective parameters from their recipe values and comprise the fault vector x(t).

Figure 11:
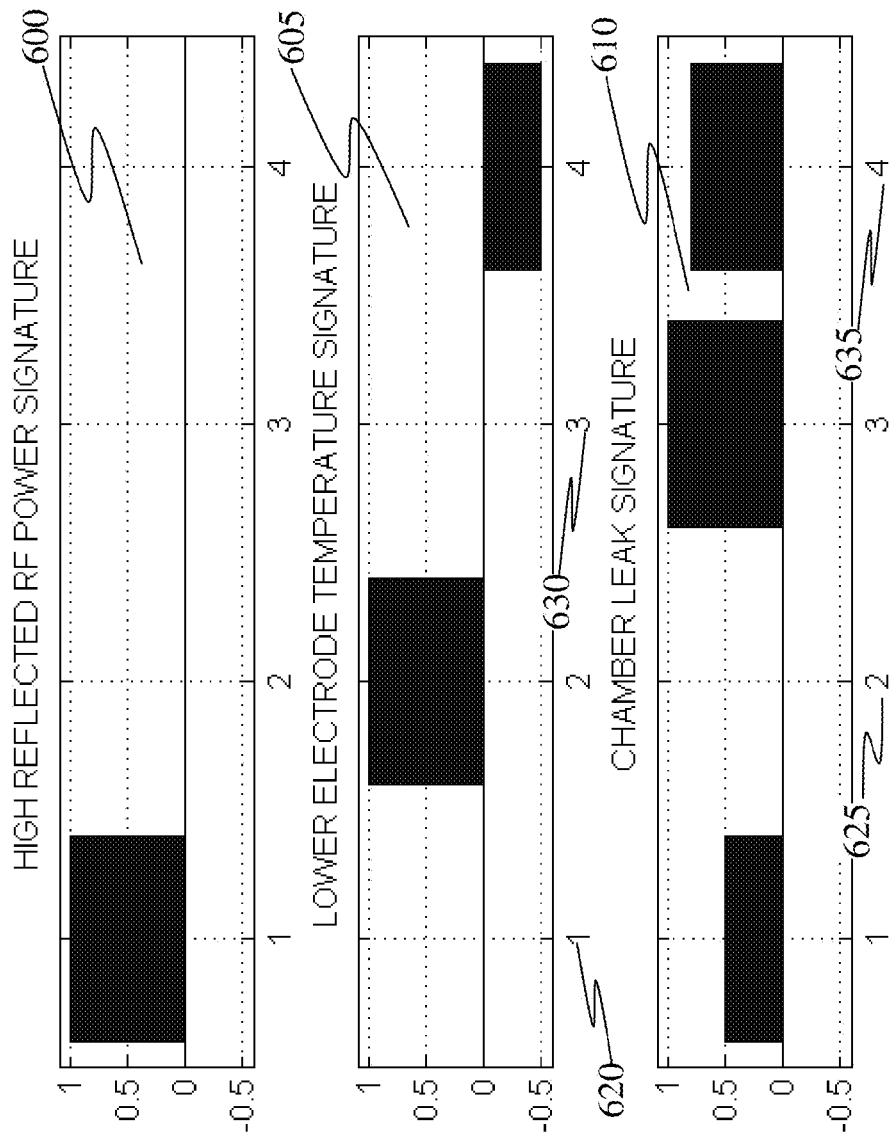
FIG. 11 is a chart which illustrates fault signatures for etching tool.

FIG. 11 illustrates the fault signatures $S_k$ relating y(t) and x(t) in accordance with (6). The upper plot 600 in FIG. 11 illustrates the fault signature $S_1$ for 'HIGH REFLECTED RF POWER' fault. The middle plot 605 in FIG. 11 illustrates the fault signature $S_2$ for 'LOWER ELECTRODE TEMPERATURE' fault. The lower plot 610 in FIG. 11 illustrates the fault signature $S_2$ for 'LOWER ELECTRODE TEMPERATURE' fault. The bar height illustrates the value of the signature vector component. The bar numbers correspond to the monitored variables: 620 bar 1 to 'REFLECTED RF POWER', 625 bar 2 to 'ELECTRODE COOLING TEMPERATURE', 630 bar 3 to 'PRESSURE CONTROL VALVE', and 635 bar 4 to 'ENDPOINT DETECTOR'.

In this third preferred embodiment example the moving horizon data are collected over a horizon 120 of n=200 runs. Such and larger horizons are possible since the diagnostic estimation processing does not need to be faster than the run duration. The moving horizon data Y(t) 125 of the form (4) is provided as one of the inputs to formulator 230. Another input is the fault signature $S_k$ illustrated in FIG. 11; a different signature at each cycle k 200, 280, 290, 285, 295.

The optimization problem formulated by formulator 230 is based on the trend model of the form (10)-(12). This model assumes that process noise $v_2(t)=0$ and process noise $v_1(t)$ is Laplacian with covariance R. The model leads to a MAP negative log-likelihood index $L=L(X_k, U)$, where $X_k=\text{col}[x_2(t-n) \ldots x_2(t)]$ and $U=\text{col}[x_1(t-n) \ldots x_1(t)]$. The formulated index optimization problem has the form $$\text{minimize } \tfrac{1}{2}\Sigma_t[\|y(t)-S_k x_2(t)\|_Q]^2 + R\Sigma_t[x_1(t)-x_1(t-1)], \qquad (19)$$

$$\text{subject to } x_2(t)=x_1(t-1)+x_2(t-1) \qquad (20).$$

The problem (19)-(20) is a QP program and can be solved by using a standard QP solver in optimizer 250.

Figure 12:
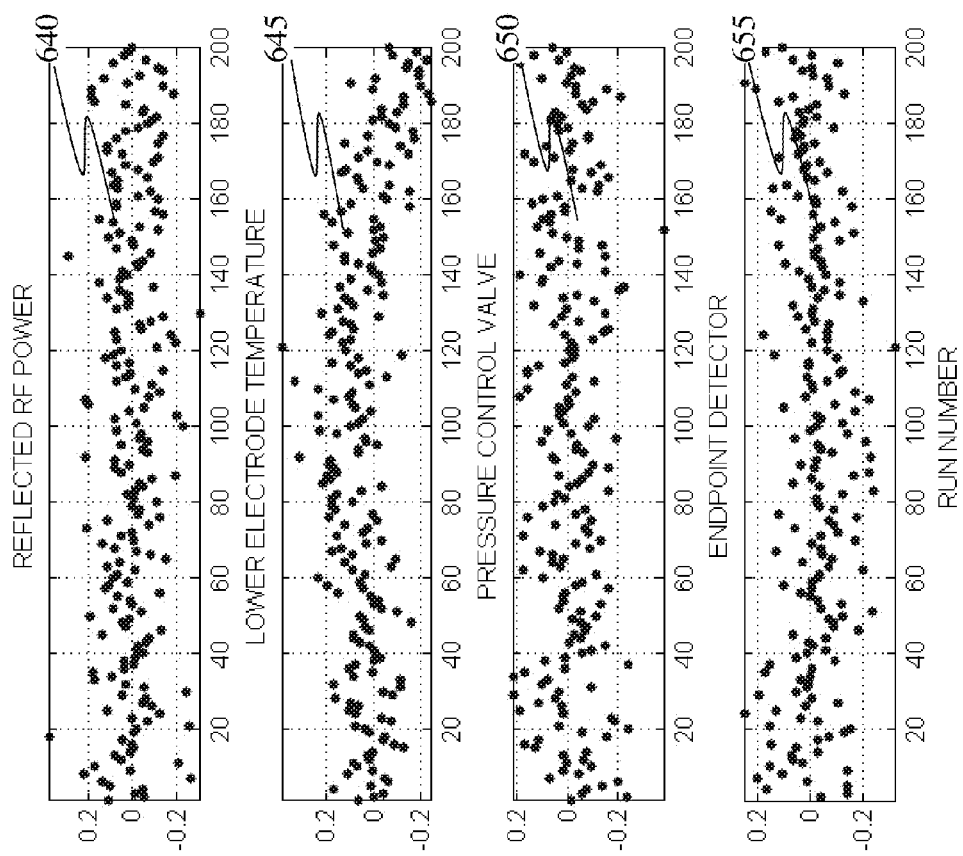
FIG. 12: is a chart which illustrates run to run data with faults for etching tool.

FIG. 12 depicts four data plots as a function of run number, including reflected RF power 640, lower electrode temperature 645, pressure control valve 650 and endpoint detector 655. Specifically, FIG. 12 illustrates example R2R data for etch tool; the tool experiences a fault which is reflected in the data but is difficult to detect without data processing. The data in FIG. 12 are normalized nondimensional variables. These data were obtained in a simulation and reflect a 'LOWER ELECTRODE TEMPERATURE' fault combined with random noise and a structured noise variation. Using the proposed method for fault estimation and computing the sorted fault intensities and likelihoods 150 yields the correct result. Fault with index k=2 was correctly determined to have the highest likelihood $p_k$. This 'LOWER ELECTRODE TEMPERATURE' fault was determined to be about 20% more likely than any other fault hypothesis or 'NO FAULT' hypothesis.

Figure 13:
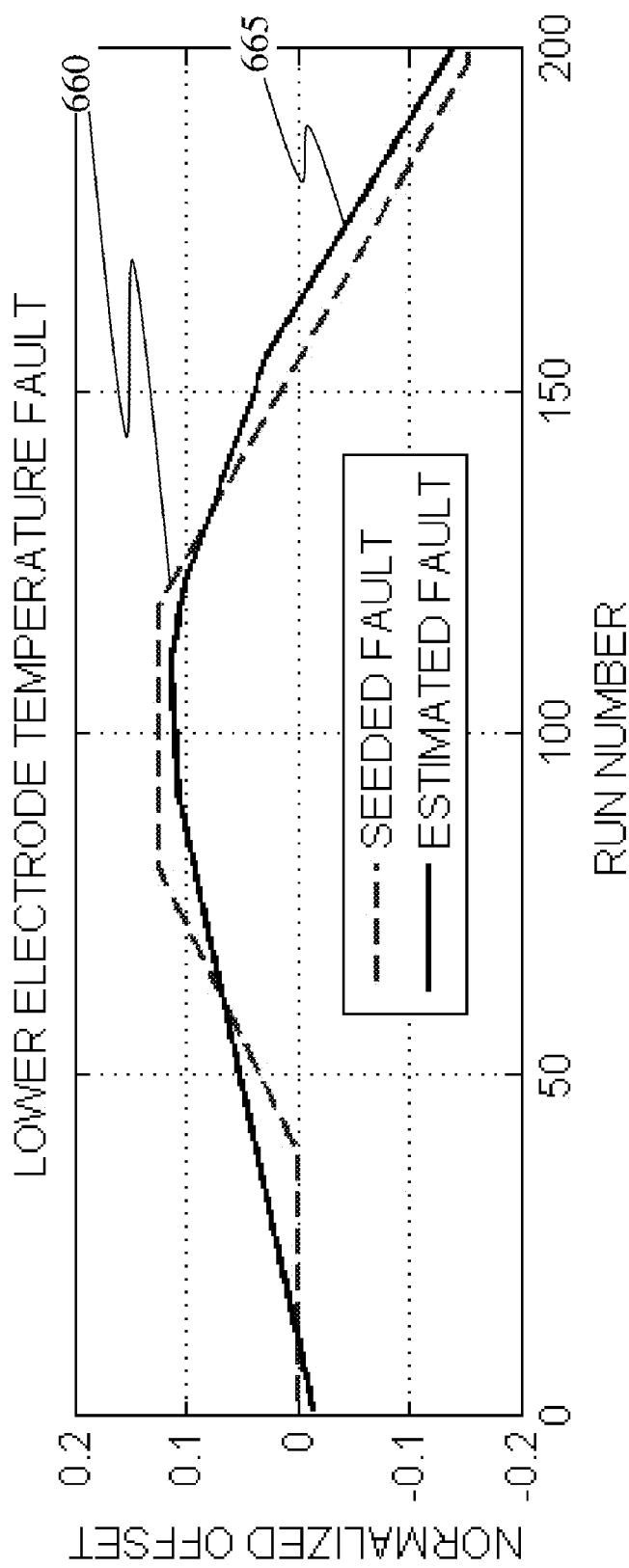
FIG. 13: is a chart which illustrates estimated fault intensity and seeded fault for etching tool.

The computed decision vector $X_2$ comprised of the fault estimate time series $x_2(t)$ 665 is illustrated in FIG. 13 in comparison with the seeded fault time series 660. FIG. 13 shows that the seeded fault 660 at the last time period and the seeded fault time series 665 over previous time periods t are estimated with good accuracy from the noisy data.

Other Applications of the Proposed Method

The proposed invention can be used in many other applications outside of the presented preferred embodiments. These applications include but are not limited to HVAC (heating, ventilation, and air conditioning equipment) such as air conditioners, heaters, chillers, and refrigerators; oil drilling rigs, aircraft systems; ground vehicles (cars, tracks, and military vehicles) and their systems; industrial manufacturing processes, such as refineries and pulp and paper plants; and other.

Exemplary Computer Platform

Figure 14:
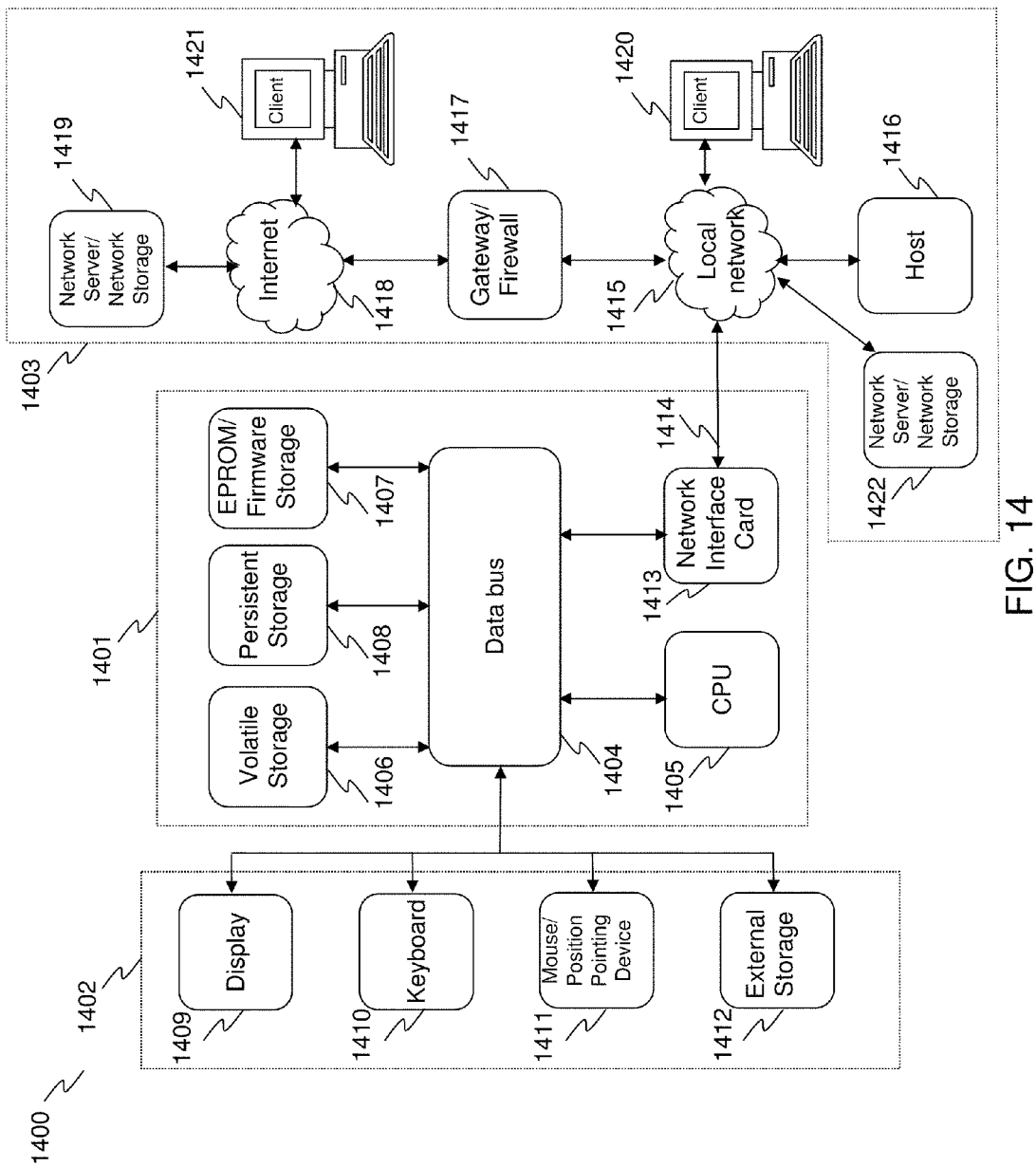
FIG. 14 is a block diagram that illustrates an embodiment of a computer/server system upon which an embodiment of the inventive methodology may be implemented.

FIG. 14 is a block diagram that illustrates an embodiment of a computer/server system 1400 upon which an embodiment of the inventive methodology may be implemented. The system 1400 includes a computer/server platform 1401, peripheral devices 1402 and network resources 1403. Perifieral devices 1402 may be absent if computer system 1400 is implemented as an embedded system, e.g., as an embedded control and monitoring system which is integrated with the apparatus.

The computer platform 1401 may include a data bus 1404 or other communication mechanism for communicating information across and among various parts of the computer platform 1401, and a processor 1405 coupled with bus 1404 for processing information and performing other computational and control tasks. Computer platform 1401 also includes a volatile storage 1406, such as a random access memory (RAM) or other dynamic storage device, coupled to bus 1404 for storing various information as well as instructions to be executed by processor 1405. The volatile storage 1406 also may be used for storing temporary variables or other intermediate information during execution of instructions by processor 1405. Computer platform 1401 may further include a read only memory (ROM or EPROM) 1407 or other static storage device coupled to bus 1404 for storing static information and instructions for processor 1405, such as basic input-output system (BIOS), as well as various system configuration parameters. A persistent storage device 1408, such as a magnetic disk, optical disk, or solid-state flash memory device is provided and coupled to bus 1404 for storing information and instructions.

Computer platform 1401 may be coupled via bus 1404 to a display 1409, such as a cathode ray tube (CRT), plasma display, or a liquid crystal display (LCD), for displaying information to a system administrator or user of the computer platform 1401. An input device 1410, including alphanumeric and other keys, is coupled to bust 1404 for communicating information and command selections to processor 1405. Another type of user input device is cursor control device 1411, such as a mouse, a trackball, or cursor direction keys for communicating direction information and command selections to processor 1404 and for controlling cursor movement on display 1409. This input device typically has two degrees of freedom in two axes, a first axis (e.g., x) and a second axis (e.g., y), that allows the device to specify positions in a plane.

An external storage device 1412 may be connected to the computer platform 1401 via bus 1404 to provide an extra or removable storage capacity for the computer platform 1401. In an embodiment of the computer system 1400, the external removable storage device 1412 may be used to facilitate exchange of data with other computer systems.

The invention is related to the use of computer system 1400 for implementing the techniques described herein. In an embodiment, the inventive system may reside on a machine such as computer platform 1401. According to one embodiment of the invention, the techniques described herein are performed by computer system 1400 in response to processor 1405 executing one or more sequences of one or more instructions contained in the volatile memory 1406. Such instructions may be read into volatile memory 1406 from another computer-readable medium, such as persistent storage device 1408. Execution of the sequences of instructions contained in the volatile memory 1406 causes processor 1405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1405 for execution. The computer-readable medium is just one example of a machine-readable medium, which may carry instructions for implementing any of the methods and/or techniques described herein. Such a medium may take many forms, including but not limited to, non-volatile media or volatile media. Non-volatile media includes, for example, optical or magnetic disks, such as storage device 1408. Volatile media includes dynamic memory, such as volatile storage 1406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 1405 for execution. For example, the instructions may initially be carried on a magnetic disk from a remote computer. Alternatively, a remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on the data bus 1404. The bus 1404 carries the data to the volatile storage 1406, from which processor 1405 retrieves and executes the instructions. The instructions received by the volatile memory 1406 may optionally be stored on persistent storage device 1408 either before or after execution by processor 1405. The instructions may also be downloaded into the computer platform 1401 via Internet using a variety of network data communication protocols well known in the art.

The computer platform 1401 also includes a communication interface, such as network interface card 1413 coupled to the data bus 1404. Communication interface 1413 provides a two-way data communication coupling to a network link 1414 that is connected to a local network 1415. For example, communication interface 1413 may be an integrated services digital network (ISDN) card or a modem to provide a data communication connection to a corresponding type of telephone line. As another example, communication interface 1413 may be a local area network interface card (LAN NIC) to provide a data communication connection to a compatible LAN. Wireless links, such as well-known 802.11a, 802.11b, 802.11g and Bluetooth may also used for network implementation. In embedded avionics implementations of the network, one of the standard backplane data buses such as, ARINC 629 or an optical avionics data bus may be used. A TTP data bus may also be used, such as in automotive and aerospace applications. In any such implementation, communication interface 1413 sends and receives electrical, electromagnetic or optical signals that carry digital data streams representing various types of information.

Network link 1413 typically provides data communication through one or more networks to other network resources. For example, network link 1414 may provide a connection through local network 1415 to a host computer 1416, or a network storage/server 1422. Additionally or alternatively, the network link 1413 may connect through gateway/firewall 1417 to the wide-area or global network 1418, such as an Internet. Thus, the computer platform 1401 can access network resources located anywhere on the Internet 1418, such as a remote network storage/server 1419. On the other hand, the computer platform 1401 may also be accessed by clients located anywhere on the local network 1415 and/or the Internet 1418. The network clients 1420 and 1421 may themselves be implemented based on the computer platform similar to the platform 1401.

Local network 1415 and the Internet 1418 both use electrical, electromagnetic or optical signals that carry digital data streams. The signals through the various networks and the signals on network link 1414 and through communication interface 1413, which carry the digital data to and from computer platform 1401, are exemplary forms of carrier waves transporting the information.

Computer platform 1401 can send messages and receive data, including program code, through the variety of network(s) including Internet 1418 and local network 1415, network link 1414 and communication interface 1413. In the Internet example, when the system 1401 acts as a network server, it might transmit a requested code or data for an application program running on client(s) 1420 and/or 1421 through Internet 1418, gateway/firewall 1417, local network 1415 and communication interface 1413. Similarly, it may receive code from other network resources.

The received code may be executed by processor 1405 as it is received, and/or stored in persistent or volatile storage devices 1408 and 1406, respectively, or other non-volatile storage for later execution. In this manner, computer system 1401 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, VHDL, C/C++, Matlab/Simulink, Labview, python, perl, Java, etc.

Moreover, other implementations of the invention will be apparent to those skilled in the art from consideration of the specification and practice of the invention disclosed herein. Various aspects and/or components of the described embodiments may be used singly or in any combination in the inventive diagnostic and monitoring system. It is intended that the specification and examples be considered as exemplary only, with a true scope and spirit of the invention being indicated by the following claims.

What is claimed is:

1. A method for computing diagnostic estimates for faults of an apparatus with condition sensors connected to a computer;
the method comprising:
processing data from the condition sensors to obtain a set of parity parameters y reflecting apparatus condition deviation from normality at time period t, wherein the processing is performed by a processing module programmed for processing data from the sensors,
collecting the parity parameters y over a moving horizon interval of time of a fixed maximal duration and ending at time period t in a data vector Y(t), wherein the collecting is performed by a collector module configured for collecting the parity parameters y,
computing estimates of at least one fault condition and likelihood parameters for each of the at least one fault condition, wherein computing is performed using a computing module configured for computing estimates of fault conditions and likelihood parameters for each of the fault conditions, and
transmitting the computed estimates of the fault conditions to the display device or to an automated decision and control system or storing the estimates in the memory, wherein the transmitting is performed using a transmitting module configured for transmitting the computed estimates of the fault conditions;
wherein a fault condition k at time period t is characterized by fault intensity parameter $x_k(t)$;
computing estimates of the fault intensity parameter $x_k(t)$ over the moving horizon interval of time and likelihood parameters $p_k$ for each fault condition k, said computation being done for one fault condition k at a time, said computation further being performed in two steps, the first step being a formulator step and the second step being an optimizer step,
wherein the formulator step formulates a convex optimization program for a fault condition using the data vector Y(t), and the fault signature corresponding to the fault condition k,
wherein the optimizer step numerically finds a solution of the convex optimization program encoded by the formulator step, the solution being computed with a pre-defined accuracy for fault condition k;
and whereby the computed estimates for faults comprises estimates of fault condition intensity parameters $x_k(t)$ over the moving horizon interval of time computed as an optimal solution or as a transformation of the solution, and
likelihood parameter $p_k$ computed as an optimum value of the program or as a transformation of the optimum value.

2. The method of claim 1 wherein the formulator step further comprises formulating and the optimizer step further comprises solving a convex optimization program of either:
  a) an isotonic or monotonic regression program,
  b) a univariate convex program,
  c) a Quadratic Program,
  d) a Linear Program,
  e) a Second-order Cone Program,
  f) a constrained convex optimization program, or
  g) a convex optimization program having a known optimizer solver.

3. A method of claim 1 wherein the convex optimization program further comprises additional decision variables in addition to the fault intensity parameters $x_k(t)$.

4. The method of claim 1 wherein the parity parameters y further comprise prediction residuals obtained as a difference of obtained readings from the sensor and readings predicted for an apparatus model which receives the same inputs as the apparatus; the apparatus model comprising either a dynamic model, a nonlinear map, a set of static values corresponding to a chosen steady state regime, or another computer simulation model of the apparatus.

5. The method of claim 1 wherein fault signatures represent responses observed in the data y when a fault occurs.

6. The method of claim 1 wherein the method is implemented on-line in a computer or computers connected to the sensors of the apparatus or implemented off-line by collecting data from the apparatus, transmitting it by electronic means to a computer implementing the method, and performing the method computations at a later time.

7. The method of claim 1 wherein the fault condition parameters and likelihood parameters computed by the optimizer are used for improving safety of the apparatus operation, or for improving apparatus performance, or for scheduling a maintenance action.

8. The method of claim 1 where the formulator step further comprises formulating and the optimizer step further comprises solving the convex problem when one or more of the components of vector Y(t) is missing or unavailable.

9. A system for computing diagnostic estimates for faults of an apparatus with condition sensors connected to a computer;
the system comprising:
a processing module programmed for processing data from the sensors to obtain a set of parity parameters y reflecting apparatus condition deviation from normality at time period t,
a collector module configured for collecting the parity parameters y over a moving horizon interval of time of a fixed maximal duration and ending at time period t in a data vector Y(t),
a computing module configured for computing estimates of fault conditions and likelihood parameters for each of the fault conditions, and
a transmitting module configured for transmitting the computed estimates of the fault conditions to a display device or to an automated decision and control system or storing the estimates in memory;
wherein a fault condition k at time period t is characterized by fault intensity parameter $x_k(t)$,
a computing circuit computing fault intensity parameters $x_k(t)$ over the moving horizon interval of time and likelihood parameters $p_k$ for each fault condition k, said computing is done for one fault condition k at a time, said computing is performed in two steps, the first step being a formulator step and the second step being an optimizer step,
the formulator step formulates a convex optimization program for fault condition using the moving horizon data vector Y(t), and the fault signature corresponding to the fault condition k,
the optimizer step numerically finds the solution of the convex optimization program encoded by the formulator, the solution is computed with a pre-defined accuracy for fault condition k;
whereby the diagnostic estimates for faults comprises
estimates of fault condition intensity parameters $x_k(t)$ over the moving horizon interval of time computed as the optimal solution or as a transformation of the said solution, and
likelihood parameter $p_k$ computed as the optimum value of the program or as a transformation of the said optimum value.

10. A system of claim 9 wherein the formulator step formulates and the optimizer step solves one of the following optimization programs
a) an isotonic or monotonic regression program
b) a univariate convex program
c) a Quadratic Program
d) a Linear Program
e) a Second-order Cone Program,
f) a constrained convex optimization program, or
g) a convex optimization program having a known optimizer solver.

11. The system of claim 9 wherein the convex program for the fault condition includes additional decision variables in addition to the fault intensity parameters $x_k(t)$.

12. The system of claim 9 wherein the parity parameters y further comprise prediction residuals obtained as a difference of the obtained sensor readings and the readings predicted for an apparatus model which receives the same inputs as the apparatus; the apparatus model comprising either a dynamic model, a nonlinear map, a set of static values corresponding to a chosen steady state regime, or another computer simulation model of the apparatus.

13. The system of claim 9 wherein fault signatures represent responses observed in the parity parameters y when a fault occurs.

14. The system of claim 9 wherein the system is implemented on-line in a computer or computers connected to the sensors of the apparatus or implemented off-line by collecting data from the apparatus, transmitting it by electronic means to a computer implementing the method, and performing the method computations at a later time.

15. The system of claim 9 wherein the fault condition parameters and likelihood parameters computed by the optimizer are used for improving safety of the apparatus operation, or for improving apparatus performance, or for scheduling a maintenance action.

16. The system of claim 9 wherein the formulator step formulates and the optimizer step solves the convex problem when one or more of the components of vector Y(t) is missing or unavailable.

17. A tangible computer readable medium embodying a set of computer-executable instructions, which, when executed on a computer, implements a method for computing diagnostic estimates for faults of an apparatus with condition sensors connected to a computer;
the method comprising:
processing data from the condition sensors to obtain a set of parity parameters y reflecting apparatus condition deviation from normality at time period t, wherein the processing is performed by a processing module programmed for processing data from the sensors,
collecting the parity parameters y over a moving horizon interval of time of a fixed maximal duration and ending at time period t in a data vector Y(t), wherein the collecting is performed by a collector module configured for collecting the parity parameters y,
computing estimates of at least one fault condition and likelihood parameters for each of the at least one fault condition, wherein computing is performed using a computing module configured for computing estimates of fault conditions and likelihood parameters for each of the fault conditions, and
transmitting the computed estimates of the fault conditions to a display device or to an automated decision and control system or storing the estimates in memory, wherein the transmitting is performed using a transmitting module configured for transmitting the computed estimates of the fault conditions;
wherein a fault condition k at time period t is characterized by fault intensity parameter $x_k(t)$;
computing estimates of the fault intensity parameter $x_k(t)$ over the moving horizon interval of time and likelihood parameters $p_k$ for each fault condition k, said computation being done for one fault condition k at a time, said computation further being performed in two steps, the first step being a formulator step and the second step being an optimizer step,
wherein the formulator step formulates a convex optimization program for a fault condition using the data vector Y(t), and the fault signature corresponding to the fault condition k, wherein the optimizer step numerically finds a solution of the convex optimization program encoded by the formulator step, the solution being computed with a pre-defined accuracy for fault condition k;

and wherein the computed estimates for faults comprises:
- estimates of fault condition intensity parameters $x_k(t)$ over the moving horizon interval of time computed as an optimal solution or as a transformation of the solution, and
- likelihood parameter $p_k$ computed as an optimum value of the program or as a transformation of the optimum value.

18. The computer readable media of claim 17 wherein the formulator step further comprises formulating and the optimizer step further comprises solving a convex optimization program of either:
   a) an isotonic or monotonic regression program,
   b) a univariate convex program,
   c) a Quadratic Program,
   d) a Linear Program,
   e) a Second-order Cone Program,
   f) a constrained convex optimization program, or
   g) a convex optimization program having a known optimizer solver.

19. The computer readable media of claim 17 wherein the convex optimization program further comprises additional decision variables in addition to the fault intensity parameters $x_k(t)$.

20. The computer readable media of claim 17 wherein the parity parameters y further comprise prediction residuals obtained as a difference of obtained readings from the sensor and readings predicted for an apparatus model which receives the same inputs as the apparatus; the apparatus model comprising either a dynamic model, a nonlinear map, a set of static values corresponding to a chosen steady state regime, or another computer simulation model of the apparatus.

21. The computer readable media of claim 17 wherein fault signatures represent responses observed in the data y when a fault occurs.

22. The computer readable media of claim 17 wherein the method is implemented on-line in a computer or computers connected to the sensors of the apparatus or implemented off-line by collecting data from the apparatus, transmitting it by electronic means to a computer implementing the method, and performing the method computations at a later time.

23. The computer readable media of claim 17 where the fault condition parameters and likelihood parameters computed by the optimizer are used for improving safety of the apparatus operation, or for improving apparatus performance, or for scheduling a maintenance action.

24. The computer readable media of claim 17 where the formulator step further comprises formulating and the optimizer step further comprises solving the convex problem when one or more of the components of vector Y(t) is missing or unavailable.

* * * * *